Figure 10:
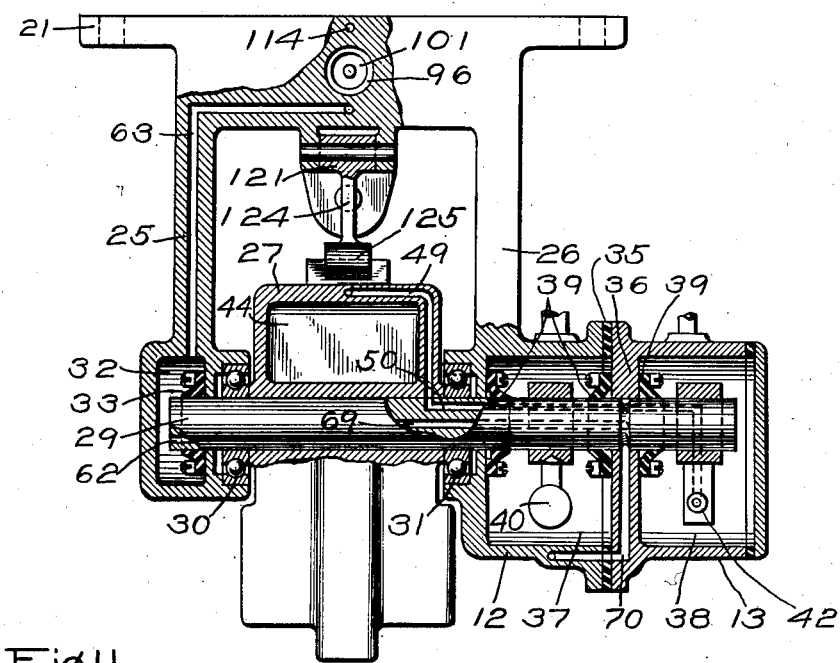

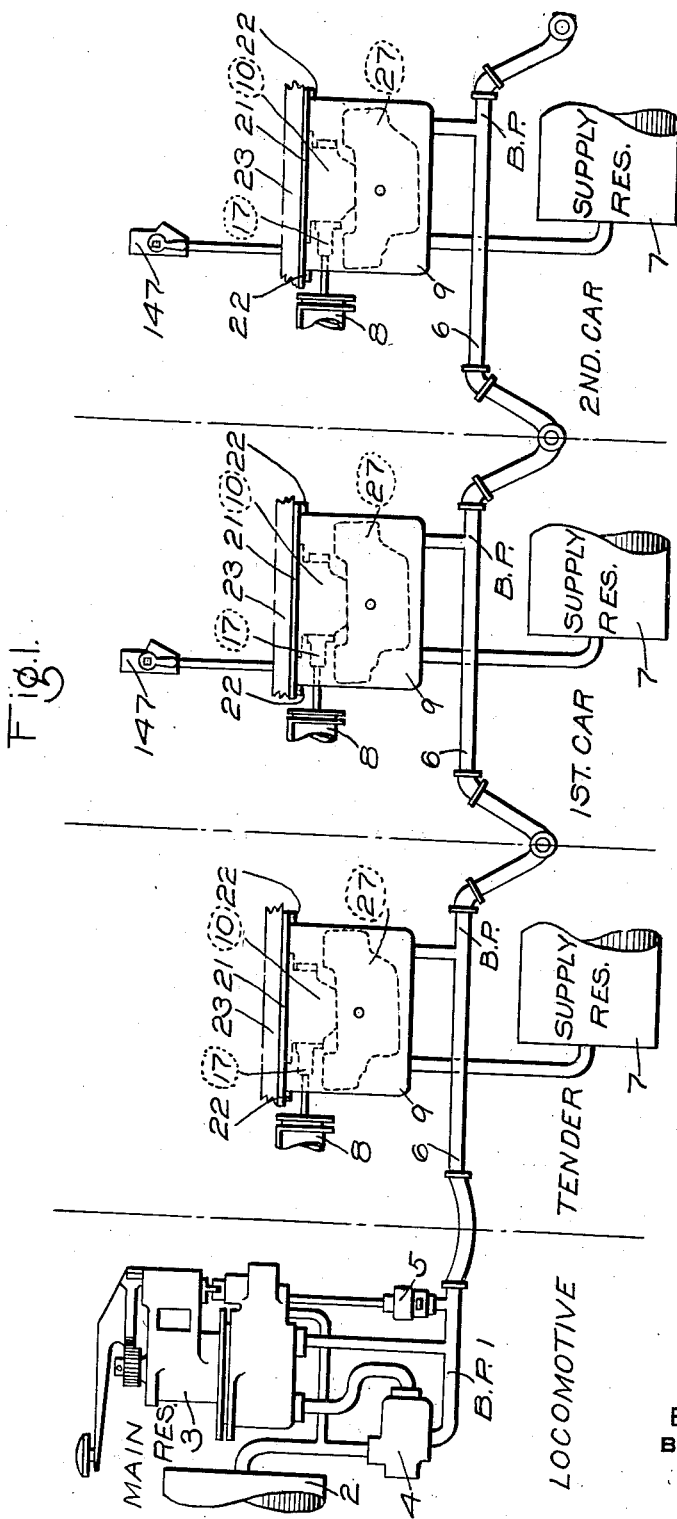

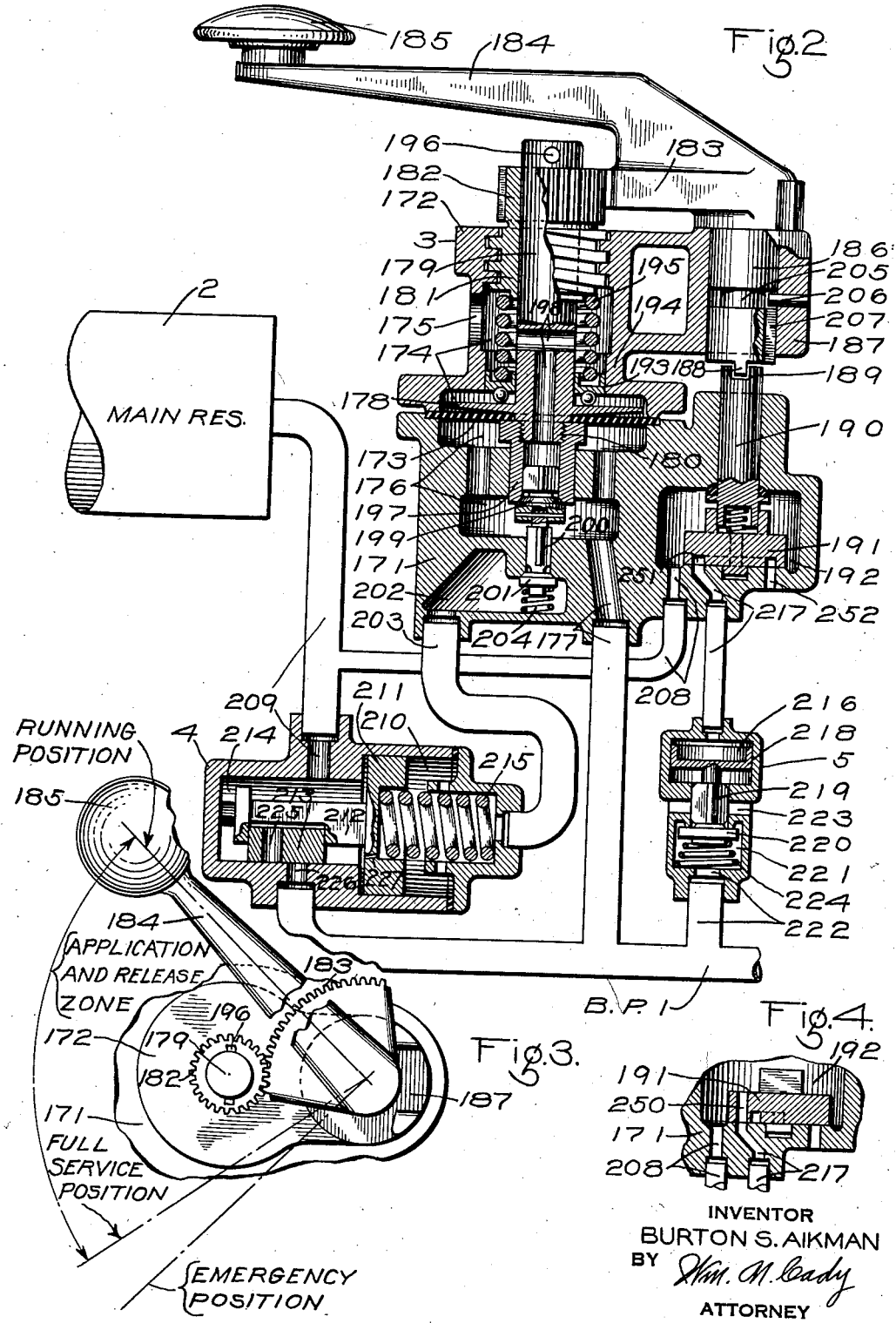

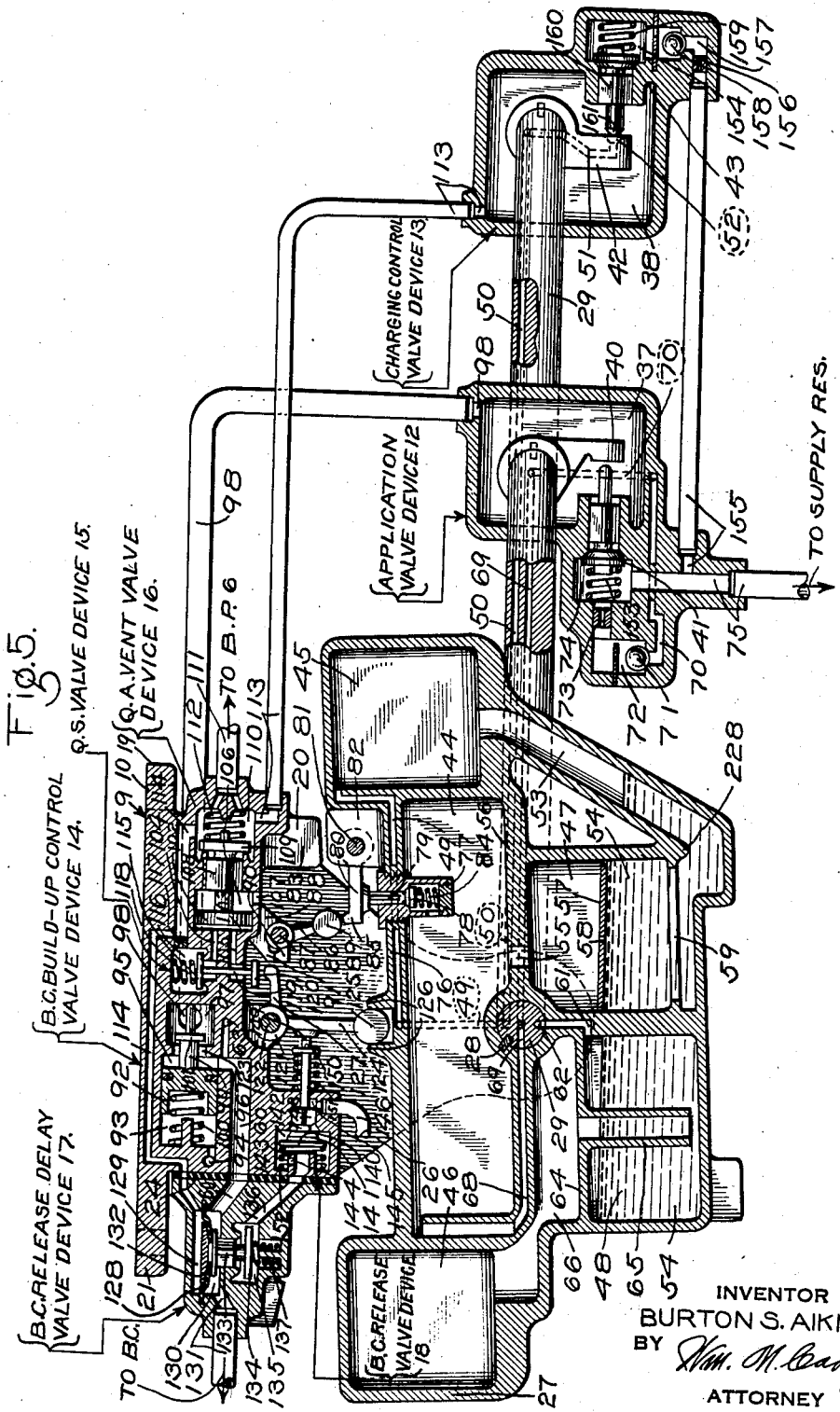

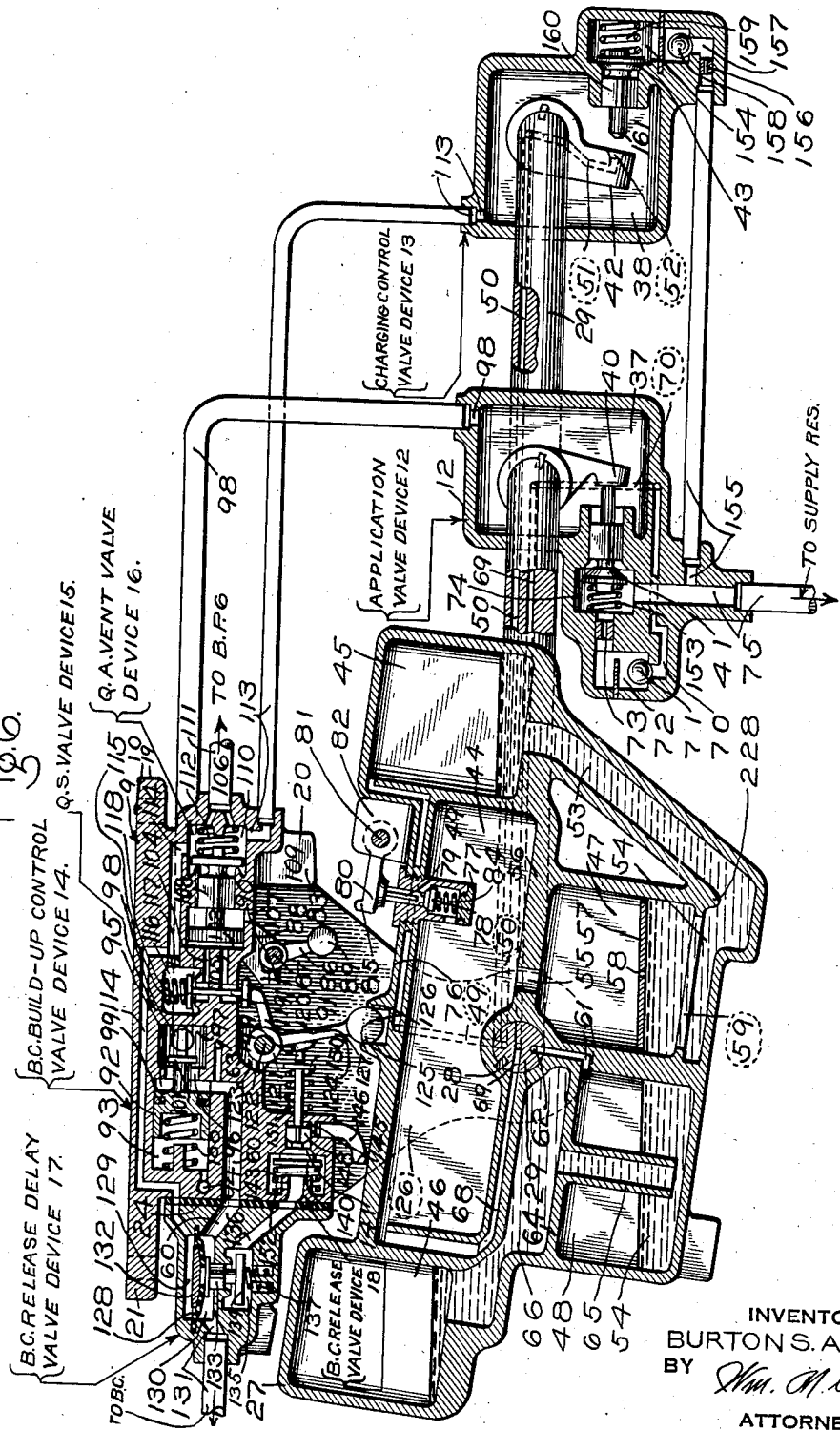

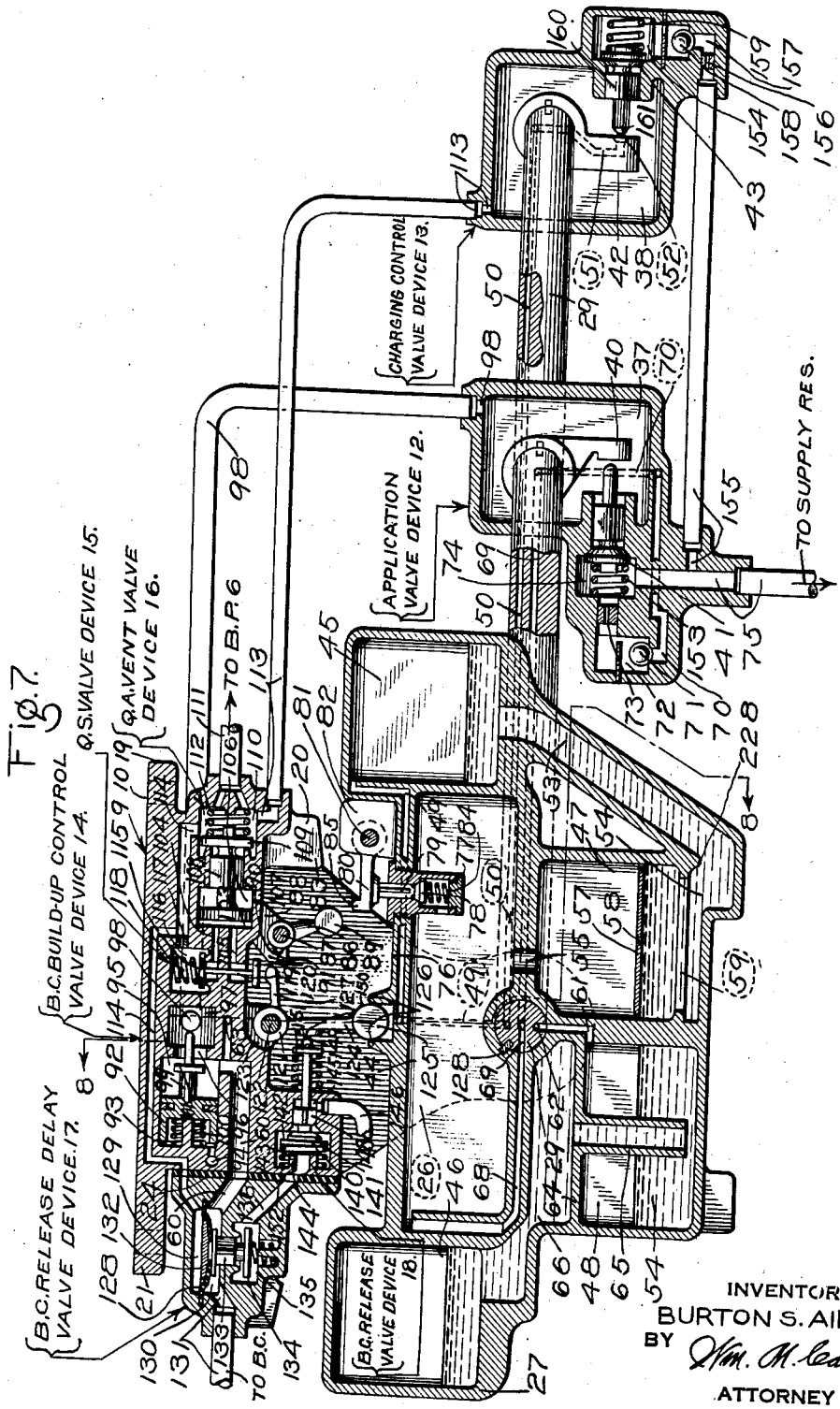

Feb. 14, 1939.  B. S. AIKMAN  2,147,279
FLUID PRESSURE BRAKE
Filed Jan. 13, 1937  8 Sheets-Sheet 6
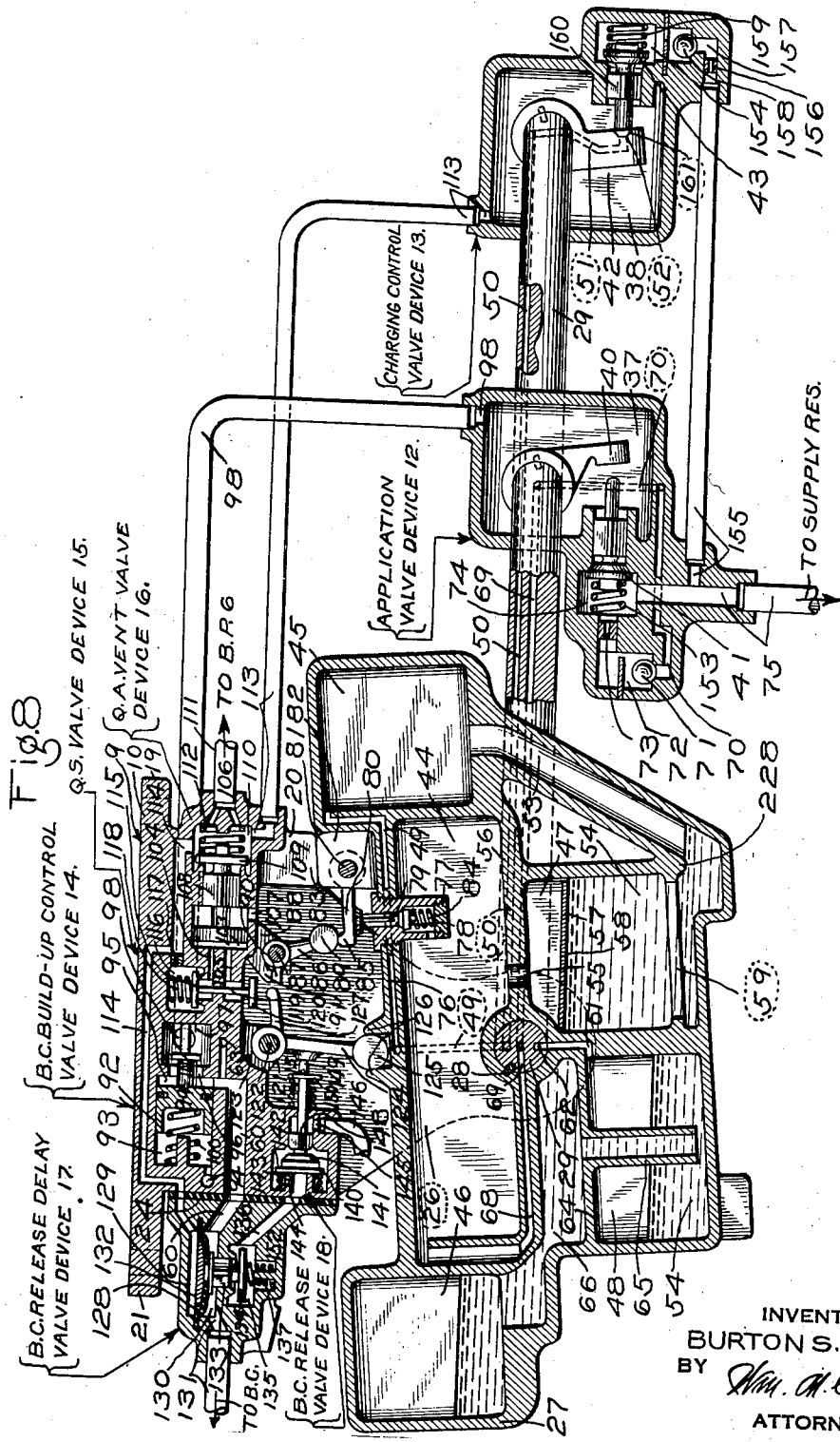
INVENTOR
BURTON S. AIKMAN
BY
Wm. M. Cady
ATTORNEY

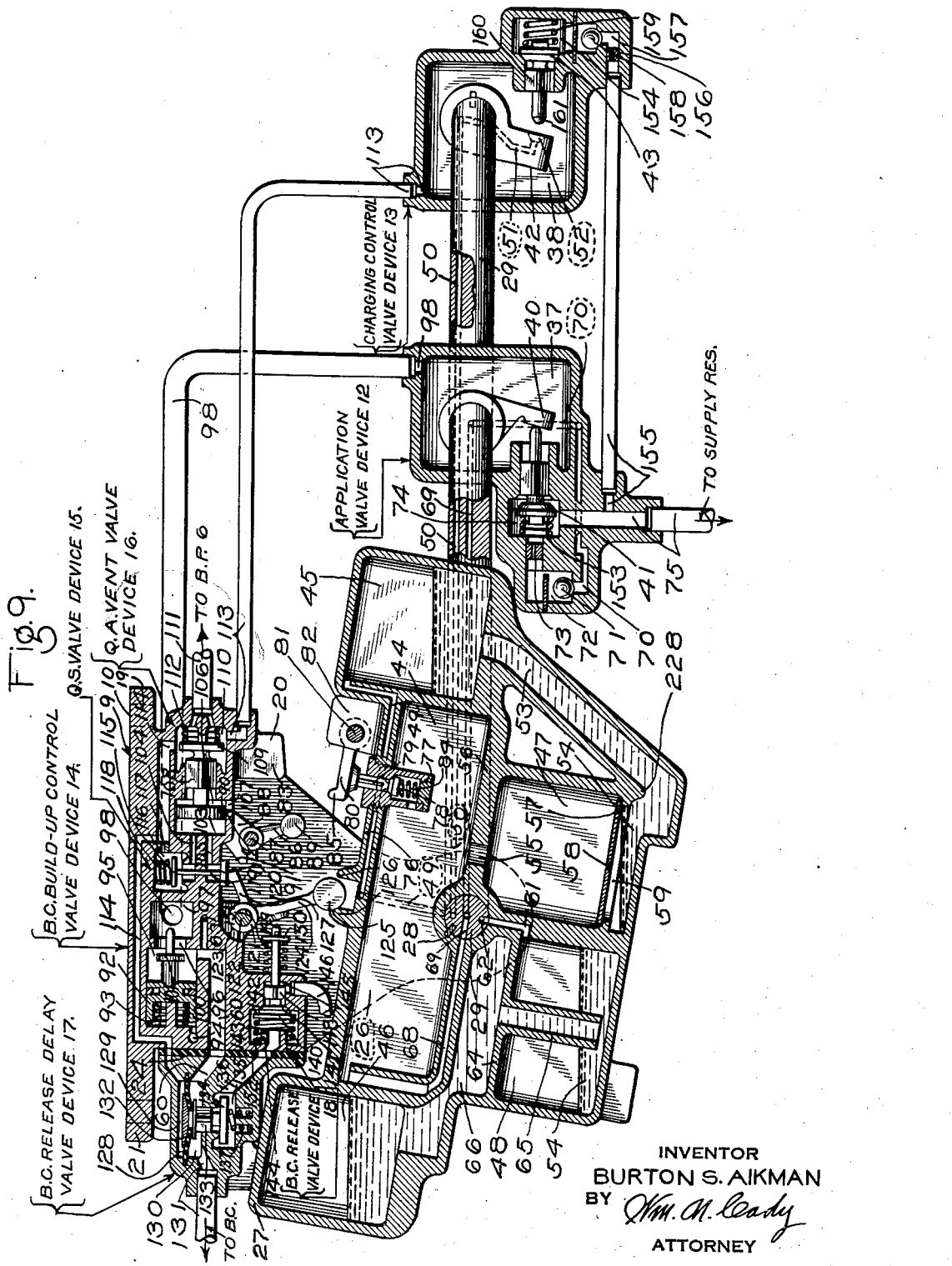

Feb. 14, 1939.   B. S. AIKMAN   2,147,279
FLUID PRESSURE BRAKE
Filed Jan. 13, 1937   8 Sheets-Sheet 8

INVENTOR
BURTON S. AIKMAN
BY
ATTORNEY

Patented Feb. 14, 1939

2,147,279

UNITED STATES PATENT OFFICE 2,147,279

FLUID PRESSURE BRAKE

Burton S. Aikman, Wilkinsburg, Pa., assignor to The Westinghouse Air Brake Company, Wilmerding, Pa., a corporation of Pennsylvania Application January 13, 1937, Serial No. 120,378

72 Claims. (Cl. 303—35)

This invention relates to fluid pressure brakes and more particularly to a fluid pressure brake equipment of a type which is operative according to variations in the pressure of a control pipe for controlling the application and release of the brakes on cars of a railway train.

One of the principal objects of the invention is to provide a novel fluid pressure brake equipment of the above mentioned type which is capable of controlling the application and release of the brakes, particularly on long trains, with promptness, certainty and dependability and further, without causing either harsh run-in or run-out of the slack in the train; and of materially improving the operation of the brakes on short trains.

Another object of the invention is to provide a fluid pressure brake equipment of the above mentioned type having novel means which for any given reduction in brake pipe pressure will produce the desired brake cylinder pressure regardless of the brake cylinder volume or travel of the brake cylinder piston.

Another object of the invention is to provide a fluid pressure brake equipment having novel means for maintaining the brake cylinder pressure against leakage.

Another object of the invention is to provide a fluid pressure brake equipment of the above mentioned type having novel means for effecting a retarded release of the brakes and an accelerated recharge of the brake pipe.

Another object of the invention is to provide a fluid pressure brake equipment in which there is embodied a tilting motor adapted to be controlled by transferring or shifting weight or ballast, such for instance as mercury, from one position on the motor to another or by increasing or decreasing the effectiveness of the weight in any other manner for controlling the application and release of the brakes.

Another object of the invention is to provide a fluid pressure brake equipment having novel means for facilitating the release of the brakes.

Another object of the invention is to provide a fluid pressure brake equipment having novel means for propagating a quick service reduction in brake pipe pressure throughout the length of the train, and a further feature resides in the utilization of such means to insure quick action in effecting an emergency application of the brakes.

Another object of the invention is to provide a fluid pressure brake equipment having novel means for controlling the rate of build up of brake cylinder pressure in effecting either a service or an emergency application of the brakes in such a manner as to prevent slack in the train from running in and closing so harshly as to cause excessive shock.

Another object of the invention is to provide a fluid pressure brake equipment having the above improved novel features, which will function satisfactorily in a mixed train having some of the cars equipped with my novel fluid pressure brake equipment, and other cars equipped with the old type of fluid pressure brake equipment such as the equipment embodying the K type of brake controlling valve device, and further improves the operation of the old equipment.

Another object of the invention is to provide a fluid pressure brake equipment in which the cost of construction and maintaining is reduced to a minimum.

Further object of the invention is to provide a fluid pressure brake equipment in which the usual pistons employed to effect the supply of fluid under pressure to and the release of fluid under pressure from the brake cylinder and the attendant undesired but unavoidable leakage of fluid is eliminated.

In general, the present invention contemplates the attainment of the foregoing and other objects and advantages and the elimination or minimization of certain inherent difficulties and disadvantages of fluid pressure brake equipment heretofore in use, by a mechanism which responds to variations in brake pipe pressure but which in construction and principle of operation differs materially from that of fluid pressure brake equipment at present and heretofore employed.

Additional objects and advantages will appear in the following more detailed description of the invention.

Figures 11, 12:
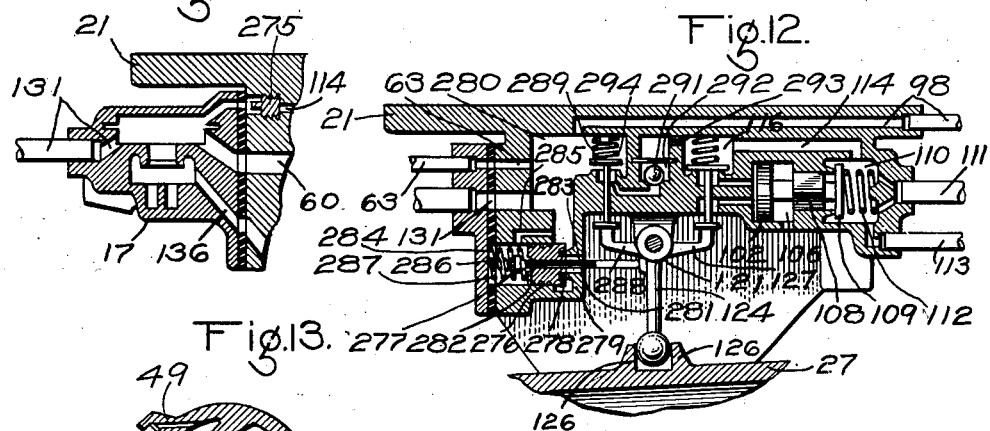
Figure 13:
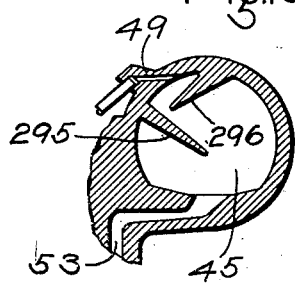

In the accompanying drawings, Fig. 1 is a diagrammatic view showing a train consisting of a locomotive, tender and two cars, the tender and each car being equipped with a fluid pressure brake equipment constructed in accordance with the invention; Fig. 2 is a diagrammatic view, mainly in section, of a portion of the locomotive brake equipment; Fig. 3 is a fragmentary plan view of the brake valve device, a portion of the handle being broken away to more clearly illustrate certain details, and the several controlling positions of the handle; Fig. 4 is a fragmentary sectional view of the emergency valve portion of the brake valve device, the emergency valve being shown in emergency position; Fig. 5 is a diagrammatic view, mainly in longitudinal section, of the fluid pressure brake equipment constructed in accordance with the invention, the several parts of the equipment being shown in normal release position; Figs. 6, 7, 8 and 9 are sectional views similar to Fig. 5 but showing the equipment in different brake controlling positions, Fig. 6 showing the equipment in service application position, Fig. 7 showing the equipment in service lap position, Fig. 8 showing the equipment in retarded release position and Fig. 9 showing the equipment in emergency position; Fig. 10 is an end elevational view, partly in section, of the equipment, the sectional portions being viewed on the line 8—8 of Fig. 7; Fig. 11 is a fragmentary sectional view of the equipment with the release delay valve mechanism removed; Fig. 12 is a fragmentary sectional view illustrating a modification of the invention; and Fig. 13 is a fragmentary sectional view illustrating another modification of the invention.

In Fig. 1 of the drawings a fluid pressure brake equipment for a railway train consisting of a locomotive, tender and two cars is diagrammatically illustrated and, as shown in this figure and also in Fig. 2, the locomotive equipment may comprise a brake pipe 1, a main reservoir 2, a brake valve device 3, a feed valve device 4 and a quick action vent valve device 5 and, although not shown, may comprise the 6ET, 8ET or any other desired distributing valve mechanism and may further comprise the usual independent brake valve device for independently controlling the locomotive brake. Since the locomotive distributing valve mechanism and independent brake valve device have no particular bearing on the present invention it is deemed unnecessary to show or describe them.

The tender and car fluid pressure brake equipment may comprise a brake pipe 6, a supply reservoir 7, a brake cylinder 8 and a brake controlling mechanism 9, which mechanism may comprise a brake controlling device 10, with which there is associated a brake application valve device 12, a charging control valve device 13, a brake cylinder pressure build-up control valve device 14, a quick service valve device 15, a quick action vent valve device 16, a brake cylinder release delay valve device 17, and a brake cylinder release valve device 18.

The brake controlling device 10 comprises a pipe bracket 19 having a casing portion 20 which has associated therewith the brake cylinder build-up control valve device 14, quick service valve device 15, quick action vent valve device 16, and brake cylinder release valve device 18, said casing having a base or flange 21 which as shown in Fig. 1 is adapted to be rigidly secured by means of bolts 22 to a relatively fixed part 23 of the vehicle. The left hand end of the pipe bracket is provided with a clamping face to which is removably clamped the brake cylinder release delay valve device 17, there being a gasket interposed between the clamping face of the bracket and device. Extending downwardly from the casing 20 and preferably integral therewith are laterally spaced lugs or legs 25, 26 between which is disposed a tiltable beam 27 which is secured, by means of a key 28, to a rockable shaft 29 mounted in ball bearings 30 and 31 carried by the lower ends of the lugs 25 and 26 respectively. The left hand end of the shaft terminates within a chamber 32 formed in the lug 25, there being an annular packing 33 contained in this chamber and secured to the lug which is adapted to engage the shaft to prevent leakage of fluid under pressure from the chamber. The lug 26 carries the casing of the application valve device 12 and secured to this casing is the casing of the charging control valve device 13, there being a gasket 35 interposed between the casings. An end wall 36 of the casing of the charging control valve device separates chambers 37 and 38 of the valve devices 12 and 13, respectively. As shown in Fig. 10 the valve devices 12 and 13 are arranged at one side of the beam 27, but in order to more clearly illustrate the details of the equipment the showing of the shaft and devices has been distorted in Figs. 5 to 9 inclusive.

The right hand end of the shaft 29 extends beyond the ball bearing 31, through chamber 37 and through an opening in the end wall 36 of the casing of the valve device 13 and terminates within the chamber 38. Secured to the opposite sides of the end wall 36 are annular packings 39 which are adapted to engage the shaft to prevent leakage of fluid under pressure between the chambers, and secured to the lug 26 there is a similar packing which is adapted to prevent leakage of fluid under pressure from the chamber 37 to the atmosphere by way of the ball bearing 31.

Contained in the chamber 37 and rigidly secured to the shaft 29 is an arm 40 which is adapted to control the operation of an application valve 41 hereinafter more fully described.

Contained in the chamber 38 and rigidly secured to the shaft 29 is an arm 42 which is adapted to control the operation of a charging control valve 43 hereinafter more fully described.

The tiltable beam 27 may comprise a casing in which there is provided a control chamber 44, a chamber 45, and a chamber 46, a well 47 and a well 48. The chambers 45 and 46 are arranged above the axis of the shaft 29 and at opposite ends of the beam equi-distant from the shaft. The wells 47 and 48, are arranged below and at opposite sides of the axis of the shaft 29, the space between the wells being considerably less than the space between the chambers 45 and 46. The control chamber 44 may be arranged above the axis of the shaft 29 and between the chambers 45 and 46, respectively.

The chamber 45 is constantly connected, through a passage 49 in the casing, a passage 50 in the shaft 29 and a passage 51 in the arm 42, to the operating face of the arm 42, the passage 51 being flared outwardly at the face of the arm to form a valve seat 52. This chamber 45 is connected through a downwardly extending passage 53 of relatively large flow area to the lower end of the well 47, which well contains a supply of mercury 54 or any other suitable weighting material which is freely movable or displaceable at all times from one place to another, the mercury being also contained in the passage 53 to a level corresponding to that of the mercury in well 47. The supply of mercury is not sufficient to fill the well 47 and the upper end of the well is connected to the control chamber 44 through a passage 55 provided in a wall 56 which separates the wells and control chamber. Contained in the well 47 and floating on top of the mercury 54 is a fluid pressure flow control member 57 which, as will hereinafter more fully appear, is adapted to control the flow of fluid from the control chamber to the brake pipe in effecting an emergency application of the brakes. This member does not have a close fit with the walls of the well 47, there being sufficient clearance between the edge of the member and the wall to permit the free flow of fluid under pressure from the under-side of the plate to the upper end of the well when charging or re-charging the equipment as will hereinafter more fully appear. This member is provided with a central opening or port 58 of small flow area which, when the mercury in well 47 is forced to a low level in effecting an emergency application of the brakes and the member seats on a seat rib 59 carried by the casing, is adapted to restrict the flow of fluid from the control chamber to the chamber 45 and consequently to the brake pipe as will hereinafter more fully appear. The well 48 is constantly connected to a brake cylinder passage 60 in the casing 20 by way of a passage 61 in the casing of the beam, a passage 62 in the shaft 29, chamber 32 in the arm 25 and casing 20 and a passage 63 in said arm and casing 20. Above the junction of the passage 61 with the well 48 a wall 64 is provided which defines the upper end of the well 48, which wall is provided with a downwardly depending tubular portion 65 which establishes communication from the bottom of the well to a passage 66 which leads upwardly and which at its upper end is constantly connected to the chamber 46. This well 48 is provided with a supply of mercury which is separate from the supply in well 47 but the amount of mercury is insufficient to completely fill the well, the level of the mercury being kept below the junction of the passage 61 with the well so that, as will hereinafter appear, fluid under pressure from the brake cylinder passage 60 and admitted to the chamber through passage 61 will act over a large portion of the area of the upper surface of the mercury. The amount of mercury contained in this well 48 is preferably greater than that contained in well 47 so that the beam will, with the brakes released, assume the tilted position in which it is shown in Fig. 5. The control reservoir 44 is connected to the supply reservoir 7 by way of a passage 68 in the casing of the beam, passage 69 in the shaft 29, and a passage 70 in the casings of the application valve device 12 and charging control valve device 13, past a ball check valve 71, ball check valve chamber 72, a choke 73, valve chamber 74 containing the application valve 41, and passage and pipe 75, as shown in Figs. 5 to 9 inclusive.

Extending into the control chamber 44 and having screw-threaded connection with an upper wall 76 of the beam casing is a spring case 77 in which there is mounted a vent valve 78 which is adapted to cooperate with a valve seat on the cage to control the release of fluid under pressure from the control chamber to the atmosphere. This valve is provided with a fluted stem 79 which extends through the vent passage in the cage to a point above the wall 76 of the beam, and at its end is in contact with an operating arm 80 which extends in a direction longitudinally of the beam and which at one end is pivotally connected by means of a pin 81 to a bracket 82 preferably integral with the wall 76 and located adjacent the right hand end of the beam. This bracket also serves as a stop member which is adapted to be engaged by a stop 83 depending downwardly from the casing 20, to limit the releasing movement of the beam as will hereinafter more fully appear. The valve 78 is normally maintained closed by means of a spring 84 carried by the cage 77.

The operating arm 80 is provided at its outer end with an upwardly extending portion 85 and located above this portion 85 is an arm 86 which, at its upper end, is rockably mounted on a pin 87 carried by a bracket 88 preferably integral with the casing 20 and extending downwardly therefrom. The lower end of the arm is provided with a weight 89 which is adapted to operatively engage the portion 85 of the arm 80. The pivoted end of the arm is provided with a lug 90 which is adapted to be engaged by a stationary stop 91 carried by the bracket, to limit movement of the arm in a counterclockwise direction for reasons which will be hereinafter fully described.

The build-up control valve device 14, in the present embodiment of the invention, is for the purpose of controlling the rate of increase in brake cylinder pressure in effecting either a service or an emergency application of the brakes, the operation of the device being such as to permit an initial inshot of fluid under pressure to the brake cylinder to apply the brakes with a light but sufficient force to start the slack in the train to gather or close, to then restrict the rate of flow of fluid under pressure to the brake cylinder to insure the gentle gathering or closing of the train slack and finally to provide a final rapid inshot of fluid under pressure to the brake cylinders to effect the desired degree of braking. This device comprises a piston 92 having at one side a chamber 93 which is connected through a passage 94 to the atmosphere, and having at the other side a chamber 95 which is connected to the brake cylinder passage 60 and which is connected to the chamber 36 of the application valve device 12 by way of a passage 96 of relatively large flow area, a chamber 97 and a passage and pipe 98. The piston 92 is provided with a stem 99 which extends through the passage 96 into the chamber 97 and at its end is normally engaged by the right hand end wall of the chamber 97, a coil spring 100 contained in the chamber 93 and acting through the medium of the piston 92 maintaining the stem in this position. The piston stem 99 intermediate its ends is provided with a circular imperforate disc 101 which has a diameter slightly less than that of the passage 96 and is adapted to be moved through this passage. It will be noted that with the piston and piston stem in their normal position, the disc 101 is wholly contained in the chamber 97 so that it does not serve to restrict the flow of fluid to the passage 96.

The quick action vent valve device 16 may comprise a piston 102 at one side of which is a piston chamber 103 to which fluid is adapted to flow by way of a passage 104 when, as will hereinafter be fully described, either a service or an emergency application of the brakes is initiated. The piston chamber is connected to a passage 105 which leads to the atmosphere and which is adapted to be maintained open to the atmosphere in controlling a service application of the brakes and to be closed upon the initiation of an emergency application of the brakes, the quick service valve device 15 controlling communication through the passage as will hereinafter appear. At the other side of the piston is a chamber 106 which is connected through a passage 107 to the atmosphere. The piston 102 is operatively connected by a fluted stem 108 to a brake pipe vent valve 109 contained in a chamber 110 to which the brake pipe 6 is connected by way of a branch pipe 111. The vent valve 109 is operative to control communication from the valve chamber 110 to the atmospheric chamber 106 and is normally maintained in its closed position by the action of a coil spring 112 contained in the chamber 110. The vent valve chamber 110 is connected through a passage and pipe 113 to the chamber 38 of the charging control valve device 13 and is also connected to a passage 114 which leads to the brake cylinder release delay valve device 17.

The quick service valve device 15 is for the purpose of venting fluid under pressure from the brake pipe to insure the propagation of quick service action from car to car throughout the length of the train and may comprise a vent valve 115 which is contained in a chamber 116 connected to the brake pipe passage 114 through the passage in a choke plug 117. This vent valve is adapted to control communication from the chamber 116 to the passage 104 and is normally maintained in its communication closing position by the action of a coil spring 118 contained in the chamber. The valve is provided with a stem 119 which extends to the exterior of the casing 20 and which at its outer end is provided with a valve 120 which, when an emergency application of the brakes is initiated, is adapted to be moved upwardly into sealing engagement with the casing to cut off communication from the passage 105 to the atmosphere and thereby condition the quick action vent valve device for operation to vent fluid under pressure from the brake pipe.

The operation of the quick service valve device 15 is adapted to be controlled by the operation of a bell crank lever 121 which is pivotally mounted on a pin 122 carried by laterally spaced brackets 123 to rock in directions longitudinally of the tiltable beam 27, which brackets extend downwardly from and are preferably integral with the casing 20. The lever 121 is provided with a substantially vertically disposed arm 124 which at its lower end is provided with a rounded portion 125 which extends between and is operatively engaged by spaced driving lugs 126 integrally connected with and extending upwardly from the wall 76 of the beam, which lugs are arranged one on each side of a vertical line passing through the axis of the shaft 29. The other arm, 127, of the lever, extends in a direction longitudinally of the beam and under the cut-off valve 120, the arm being adapted to engage the valve and cause it to seat only when an emergency application of the brakes is initiated.

The brake cylinder release delay valve device 17 is for the purpose of delaying the release of the brakes until the brake pipe pressure has been increased a predetermined degree above brake cylinder pressure or in other words until the brake pipe pressure has been increased sufficiently to cause the usual types of triple valve devices to start to move towards release position against the opposing reduced auxiliary reservoir pressure, thus contributing materially to the synchronization of the brakes on the cars of a mixed train in which some of the cars may be equipped with the usual type of brake apparatus and others may be equipped with the apparatus herein described. This delay valve device may comprise a flexible diaphragm 128 having at one side a chamber 129 connected to the brake pipe passage 114 and having at the other side a chamber 130 which is connected to the passage 60 and which is also connected through a passage and pipe 131 to the brake cylinder 8. Secured to the diaphragm is a follower 132 having a fluted stem 133 adapted to operate a delay valve 134 contained in a chamber 135 connected to a release passage 136 leading to the brake cylinder release valve device 18. Contained in the chamber 135 is a coil spring 137 which tends to urge the delay valve 134 toward its communication closing position.

The brake cylinder release valve device 18 is for the purpose of closing the release communication from the brake cylinder in initiating an application of the brakes and to effect a release of fluid under pressure from the brake cylinder at either the usual rate or a retarded rate according to the operation of the bell crank lever 121 by the tiltable beam, and may comprise connected oppositely seating valves 140 and 141 which are contained in a chamber 142 connected to the release passage 136. The valve 140 is adapted to engage an annular seat rib 143 encircling the passage 136 when, as will hereinafter be described, the tiltable beam moves to retarded release position. The seat rib 143, a short distance rearwardly from its seat, is provided with a flow restricted passage 144 which is in communication with both the passage 136 and chamber 142.

The valve 141 is adapted to control communication from the chamber 142 to a release passage 145 connected to a pipe 146 leading to the usual retainer valve device 147, as shown in Fig. 1. This valve is provided with a fluted stem 148 which is engaged at its end by the inner end of a plunger 149 which extends through the casing 20 and which at its outer end is operatively engaged by the arm 124 of the bell crank lever 121. The plunger 149 adjacent its outer end and exteriorly of the casing 20 is provided with a spring seat 150 and interposed between and engaging this spring seat and an exterior surface of the casing 20 is a heavy coil spring 151 which is adapted to be compressed only when the tiltable beam is being moved from release position to retarded release position. The purpose of this spring, as will hereinafter more fully appear, is to return the tiltable beam from its retarded release position to its normal release position. Contained in the valve chamber 142 and interposed between and operatively engaging the release valve assembly is a spring 152 which tends to urge the valve assembly towards the right hand or seating position of the valve 141.

With further reference to the application valve device 12, the valve 41 is adapted to control communication between the chambers 74 and 37 and is normally maintained seated, by the action of a coil spring 153 contained in chamber 74, said valve having a fluted stem whch extends into the chamber and which at its end is adapted to be operatively engaged by the arm 40.

With further reference to the charging control valve device 13, the valve 43 is contained in the chamber 154 to which the supply reservoir passage 75 is connected by way of a passage and pipe 155, the passage in a choke plug 156, passage 157 and past a ball check valve 158. Contained in the chamber 154 is a coil spring 159 which at all times tends to urge the valve 43 to its closed position. This valve is provided with a fluted stem 160 whch extends into the chamber 38 and the end of this stem is in the form of a valve 161 on which the valve seat 52 of the arm 42 is adapted to seat.

The brake valve device 3 of the portion of the locomotive brake equipment which is shown in Figs. 1, 2 and 3 of the drawings is of the self-lapping type and may comprise a body casing 171 and a cap 172 which is removably secured to the casing by any suitable means. Clamped between the casing and shaft is a flexible diaphragm 173 having at one side a chamber 174 which is connected through a port 175 to the atmosphere, and having at the other side a chamber 176 which is connected through a passage and pipe 177 to the locomotive brake pipe 1.

Contained in the chamber 174 is a follower 178 having a stem 179 projecting upwardly from one side thereof and having a short stem 180 projecting downwardly from the other side and through a central opening provided in the diaphragm. The stem 179 is round in cross-section and extends through a central opening in a rotatable and vertically movable control member 181 having screw-threaded connection with the upper end of the cap 172 to effect the vertical movement of the member when the member is rotated. This control member is provided with a pinion 182 which meshes with a gear segment 183 carried by a rotatable handle 184 having at one end a hand piece 185 adapted to be grasped by the operator, and having at its other end a downwardly extending portion 186 which is round in cross-section and which is journaled in a laterally projecting portion 187 of the shaft.

The lower end of the journal portion 186 of the handle 184 projects through the portion 187 of the cap and is provided with a downwardly depending cross-lug 188 which extends into a corresponding groove 189 in the upper end of the stem 190 of a rotatable emergency valve 191 contained in a chamber 192 in the casing 171, said stem being journaled in the casing in axial alignment with the portion 186 of the handle.

Contained in the chamber 174 and surrounding the stem 179 is an annular ball bearing spring seat 193 which rests on the upper surface of the follower 178 and which is slidably guided both vertically and laterally by an annular wall 194 of the cap as shown in Fig. 2. Interposed between and operatively engaging the spring seat and the inner end of the control member 181 is a control spring 195. It will here be noted that the ball bearing spring seat 193 provides for the free rotation of the control spring so that the tendency of the spring to wind up when the control member 181 is rotated is so reduced to a minimum that the danger of the spring acting to return the handle from any control position to which it has been moved is eliminated.

The upper end portion of the stem 179 projects above the pinion 182 and is provided with transversely extending pin 196 which may project from both sides of the stem and which is adapted to be engaged by the adjacent end face of the pinion when, as will hereinafter fully appear, the handle 184 is moved to emergency position. In all other positions the end face of the pinion does not engage the pin.

Contained in the chamber 176 and slidably guided by the casing 171 is a tubular sleeve 197 which has screw-threaded connection at is upper end with the stem 180 of the follower 178, said sleeve clamping the flexible diaphragm to the follower and forming an extension of the stem 180. The extension 197 and follower are provided with a passage 198 which leads to the chamber 174. Formed on the lower end of the sleeve 197 and encircling the passage 198 is a valve seat on which an exhaust valve 199 is adapted to seat to cut off communication from the chamber 176 to the exhaust passage 198. This valve is secured to the end of the fluted stem 200 of an oppositely seating pilot supply valve 201 contained in a chamber 202 which is connected through a pipe 203 to the feed or supply valve device 4, said valve 201 being at all times urged toward its seat by the action of a light coil spring 204.

As shown in Fig. 3, the brake valve handle 184 is movable through an application and release zone, one end of said zone being running position and the other being emergency application position and if desired the handle may be readily removed from the cap in running position as shown in Fig. 2. In this connection it will be noted that the journaled portion 186 of the handle is provided with a circumferential groove 205 for the reception of a securing pin 206 which has a driven fit with the portion 187 of the cap, the pin serving to lock the handle to the cap in every position except running position. In this latter position of the handle a vertical groove 207 in the portion 186 of the handle and opening into the groove 205 is directly beneath the pin and is adapted to permit the lower end of the handle portion 186 to be raised out of locking engagement with the securing pin. Due to the separable connection between the lower end of the handle portion 186 and the upper end of the emergency valve stem 190, said stem is not interfered with upon the removal of the handle or in case repairs are necessary upon the removal or replacement of the cap and handle as a unit.

The chamber 192 containing the emergency valve 191 is connected through a passage and pipe 208 and a main reservoir pipe 209 to the main reservoir 2.

The feed or supply valve device 4 is provided for the purpose of controlling the supply of fluid under pressure from the main reservoir 2 to the brake pipe and is operative in accordance with the automatic operation of the pilot supply valve 201 of the brake valve device as will hereinafter more fully appear in the description of the operation of the apparatus, and may comprise a casing having a chamber 210 connected through pipe 203 to the pilot supply valve chamber 202 of the brake valve device. Contained in this chamber 210 is a piston 211 having a stem 212 which is adapted to operate a slide valve 213 contained in a chamber 214 connected to the main reservoir pipe 209, said piston and slide valve being operative to control communication from the valve chamber 214 to the brake pipe 1. Contained in the chamber 210 and interposed between and operatively engaging the piston and the casing is a coil spring 215 which, when the fluid pressure acting on opposite sides of the piston are substantially equal to each other, is adapted to maintain the piston and slide valve in their cut-off position as shown in Fig. 2.

The vent valve device 5 comprises a casing having a chamber 216 connected to a passage and pipe 217 leading to the seat of the emergency valve 191 and containing a piston 218 having a fluted stem 219 which is adapted to control the operation of a vent valve 220 contained in a chamber 221 connected through a passage and pipe 222 to the brake pipe 1, said valve being adapted to control communication from the chamber 221 and brake pipe to a passage 223 leading to the atmosphere. The vent valve is normally maintained in its closed position as shown in Fig. 2 by the action of a coil spring 224 contained in chamber 221.

*Initial charging of the train brake equipment*

With the brake valve handle 184 in running position as shown in Fig. 3 and the locomotive fluid pressure brake equipment depleted of fluid under pressure, the brake valve control spring 195 acts through the medium of the ball bearing 193, follower 178, follower stem 180, member 197 and exhaust valve 199 to maintain the pilot valve 201 unseated against the opposing pressure of the spring 204, thus maintaining open the communication from the valve chamber 202 and thereby the piston chamber 210 of the feed valve device to the diaphragm chamber 176, passage and pipe 177 and brake pipe 1. Since the chamber 214 and 210 of the feed valve device are at atmospheric pressure the spring 215 acts to hold the piston 211 and thereby the slide valve 213 in its cut-off position.

Fluid under pressure now supplied to the main reservoir 2 in the usual manner, flows therefrom through pipe and passage 209 to the slide valve chamber 214 of the feed valve device and causes the feed valve piston 211 and thereby the slide valve 213 to move in a direction toward the right hand against the opposing pressure of the spring 215 to their cut-in position, in which fluid under pressure flows from the valve chamber 214 and connected main reservoir to the brake pipe by way of a port 225 in the slide valve and a passage 226. From the brake pipe 1 fluid under pressure flows through the brake pipe branch pipe and passage 177 to the diaphragm chamber 176 of the brake valve device and from the diaphragm chamber flows past the unseated pilot valve 201 to the piston chamber 210 of the feed valve device by way of pilot valve chamber 202 and pipe 203. It will here be noted that the valve 199 is maintained in its closed position, so that there can be no escape of fluid under pressure from the chamber 176 and consequently from the brake pipe by way of the atmospheric passage 198.

Now when the brake pipe has been charged to the pressure which it is desired to carry, say for instance to seventy pounds, fluid in the chamber 176, which is at brake pipe pressure, causes the diaphragm 173 to flex upwardly against the opposing pressure of the control spring 195, the follower 178 and member 197 being moved upwardly by the diaphragm. As the member 197 thus moves, the spring 204 acts to move the valve 201 to its closed position as shown in Fig. 2, and as the valve is seating, the pressure of fluid in chamber 210 of the feed valve device will be increased sufficiently by the flow of fluid from the valve chamber 214 by way of a small leakage passage 227 in the feed valve piston 211 as to permit the spring 215 to move the piston and thereby the slide valve 213 to their cut-out position as shown in Fig. 2 in which position, the flow of fluid from the main reservoir to the brake pipe is cut off. It will here be understood that as the valve 201 is seating the several parts of the feed valve device move to their cut-off position so that the upward flexing diaphragm will seat before the valve seat of the member 197 can move away from the exhaust valve 199, thus communication between the chamber 176 and atmospheric passage 198 is maintained closed.

Fluid under pressure supplied to the brake pipe 1 of the locomotive flows to the connected brake pipe 6 of the tender and cars of the train as will be apparent from Fig. 1 of the drawings.

Fluid under pressure flows from the brake pipe 6 on each vehicle through branch pipe 111, quick action valve chamber 110, and passage 114 to the diaphragm chamber 129 of the brake cylinder release delay valve device 17 and causes the diaphragm 128 to flex inwardly and unseat the delay valve 134, thus establishing communication from chamber 130 to the release passage 136, which, as will hereinafter more fully appear is in communication with the atmosphere by way of release valve chamber 142, past the normally unseated release valve 141, passage 145, pipe 146 and retainer valve device 147. The tender equipment does not include a retaining valve device so that the passage 145 of such equipment leads directly to the atmosphere. The passage 131 leading from the brake cylinder is in constant open communication with the chamber 130 so that the brake cylinder is normally at atmospheric pressure. The brake cylinder supply passage 60 being in communication with the passage 98 by way of piston chamber 95, port 96, chamber 97 and passage 98 and with the chamber 130, the chamber 37 of the application valve device 12 is normally at atmospheric pressure.

From the quick action vent valve chamber 110 fluid under pressure flows through passage and pipe 113 to chamber 38 of the charging control valve device 13 and from thence flows to the chamber 45 in the tiltable beam 27 by way of the open valve 161, passage 51 in the arm 42 of the charging control valve device, passage 50 in the shaft 29, and passage 49 in the beam.

The chamber 45 being in constant open communication with the passage 53, fluid under pressure acting on the surface of the mercury in this passage causes the mercury to be displaced to the well 47 until the level of the mercury in the passage is lowered to the junction point 228 of the passage with the well. With the mercury in the passage at this level, fluid under pressure flows or bubbles through the mercury in the well and past the member 57 to that portion of the well which is above the member and from thence flows through passage 55 to the control chamber 44.

From the control chamber 44 fluid under pressure flows to the supply reservoir 7 by way of passage 68 in the beam, passage 69 in the shaft 29, passage 70, past ball check valve 71 mounted in the casing of the application valve device 12, ball check valve chamber 72, the flow restricting passage in the choke 73, valve chamber 74 and passage and pipe 75.

Now when the pressure of fluid in control chamber 44 is increased to substantially that of the fluid in passage 53, the mercury which has been displaced from passage 53 will flow back from the well 47 to the passage. It will here be understood that the pressure of fluid in the control chamber, when the chamber is fully charged, will be less than that of the pressure of fluid in the brake pipe by an amount equal to that required to displace the column of mercury in the passage. Obviously this difference in pressures will be so slight as to be negligible. Due to the brake pipe pressure present in passage 53, when the equipment is fully charged, being slightly greater than that of the control chamber, the mercury in the passage will not attain its natural level as shown in Fig. 5, but this is immaterial and will have no appreciable effect upon the operation of the equipment.

With the beam 27 in release position as shown in Fig. 5, the spring 151 acting through the medium of the plunger 149, bell crank lever 121 and lug 36 on the beam, acts to stabilize the beam against unintentional tilting back and forth between release and retarded release position, thus preventing undue wear of the several movable parts of the apparatus which are associated with the beam.

From the foregoing description of the operation it will be seen that the equipment is fully charged to the pressure which it is desired to carry and that the brake cylinder is connected to the atmosphere.

*Service application*

When it is desired to effect a full service application of the brakes, the operator moves the brake valve handle 184 from running position and through the application and release zone to full service position. Upon such movement of the handle the tooth segment 183 thereof meshing with the teeth on the pinion 182 causes the pinion and thereby the screw-threaded portion of the control member 181 to rotate in a clockwise direction relative to the stem 179 of the follower 178, and as the member is thus rotated the screw threads on the member and those on the casing cooperate to move the member upwardly relative to the follower stem 179. With the handle in full service position the upper end of the pinion does not operatively engage the pin 196 carried by the stem 179, therefore the member as it is moved upwardly does not effect upward movement of the stem.

As the member 181 is moving upwardly it permits the control spring 195 to expand, thus reducing the pressure of the spring and thereby permitting fluid at full brake pipe pressure present in chamber 176 to flex the diaphragm 173 upwardly, the diaphragm upon such movement shifting the follower 178, follower stems 179 and 180 and follower stem extension 197 in the same direction against the opposing adjusted pressure of the spring 195. Since, with the pilot valve 201 seated, the valve 198 cannot move upwardly with the stem extension 197, the valve seat carried by the extension is moved away from the valve 199 so that fluid under pressure is now vented from the brake pipe to the atmosphere by way of brake pipe branch pipe and passage 177, chamber 176, past the valve 199, passage 198, chamber 174 and passage 175, thus initiating a reduction in brake pipe pressure. Now when the brake pipe pressure has been reduced slightly below the opposing pressure of the spring 195, said spring acts to move the diaphragm and thereby the diaphragm stem extension downwardly, the valve seat on the stem extension engaging the valve 199 to cut off the flow of fluid from the chamber 176 and consequently from the brake pipe to the atmosphere. With the exhaust flow of fluid from the chamber 176 and the brake pipe thus cut off, the downward flexing of the diaphragm ceases, so that the pilot valve 201 remains seated.

The brake pipes of the locomotive tender and cars are connected together in the usual manner and, in effect, form a continuous brake pipe from end to end of the train, so that the reduction in brake pipe pressure effected in the manner just described will be effective on each car of the train.

Since, as hereinbefore described, the brake pipe is in communication with the chamber 45 of the tiltable beam 27 by way of pipe 111, quick action vent valve chamber 110, passage and pipe 113, chamber 38 of the charging control valve device 13, passage 51 in the arm 42 and passages 50 and 49, the pressure of fluid in this chamber reduces with brake pipe pressure.

As the pressure of fluid in chahber 45 is reducing with brake pipe pressure, the pressure of fluid in the control chamber 44 and unoccupied portion of the mercury well 47 forces mercury from the well and connected passage 53 upwardly into chamber 45. Since the chamber 45 is located some distance to the right of the well 47, the weight of the mercury displaced into the chamber 45 causes the beam, shaft 29 and arms 41 and 42 secured to the shaft to rock or tilt in a clockwise direction from their normal release position as shown in Fig. 5 to their service position as shown in Fig. 6.

As the beam is being thus tilted or rocked from normal release position, the lugs 126 of the beam cause the bell crank lever 121 to rock in a counterclockwise direction about the pin 122. As the lever is thus moving, the arm 124 thereof moves out of supporting relationship with the plunger 149 of the release valve device and permits the spring 151 to expand to its free length and, in so expanding, moves the plunger out of supporting relationship with the release valve 141, so that the spring 152 is permitted to move the release valve to its closed position as shown in Fig. 6. At substantially the same time as the release valve 141 seats the arm 127 of the bell crank lever engages the valve 120 of the quick service valve device 15 and through the medium of this valve and valve stem 119 moves the quick service vent valve 115 upwardly from its seat against the opposing pressure of the spring 118.

With the quick service vent valve 115 unseated fluid under pressure is locally vented from the brake pipe to the atmosphere by way of branch pipe 111, quick action valve chamber 110, passage 114, the flow restricting passage in the choke plug 117, quick service vent valve chamber 116, past the open quick service vent valve 115, passage 104, quick action piston chamber 103 and passage 105. The flow areas of the passage in the choke plug 117 and the passage 105 are so proportioned, with respect to each other, that the flow of fluid under pressure from the brake pipe to the quick action piston chamber 103 is not permitted to build up a sufficient fluid pressure in this chamber to move the quick action piston 102 toward the right hand and cause an undesired emergency application. The flow area of the passage in the choke plug 117 is such that enough fluid pressure is vented from the brake pipe to cause a definite local reduction in brake pipe pressure, which reduction is transmitted in like manner to the next tiltable beam and in turn to the next, thus increasing the rapidity with which the brake pipe reduction travels throughout the length of the train. This quick service venting of fluid under pressurue from the brake pipe continues as long as the tiltable beam is in service position.

After the quick service vent valve 115 has been unseated the continued rocking of the beam and thereby the shaft 29 to service position causes the arm 40 carried by the shaft 29 to engage the stem of the supply valve 41 of the application valve device 12 and move the valve 41 from its seat against the opposing pressure of the spring 153. Fluid under pressure now flows from the supply reservoir 7 to the brake cylinder by way of pipe and passage 75, supply valve chamber 74 of the application valve device 12, past the open supply valve 41, chamber 37, passage and pipe 98, chamber 97 in the brake cylinder build up control valve device 14, passage 96, piston chamber 95, passage 60, diaphragm chamber 130 of the brake cylinder release delay valve device 17, and passage and pipe 131. It will here be noted that due to the displacement of the mercury in well 47 the pressure of fluid in control chamber 44 is reduced by the expansion of the fluid into the space formerly occupied by the mercury to substantially brake pipe pressure.

Now when the pressure of fluid in piston chamber 95 of the brake cylinder build up control valve device 14 has been increased a predetermined amount, for instance to around fifteen pounds, the piston 92 starts to move in a direction toward the left hand against the opposing pressure of the spring 100, and as it thus moves it acts, through the medium of the piston stem 99, to shift the imperforate disc 101 into the passage 96 where it serves to restrict the passage 96 and thereby retard the rate of flow of fluid to the brake cylinder. As the pressure of fluid in the piston chamber 95 continues to increase the piston continues to move the disc 101 through the passage 96 until the disc is clear of the passage, at which time the flow of fluid through the passage 96 to the brake cylinder will again be at a rapid rate. This latter rate of flow of fluid to the brake cylinder continues until the desired brake application has been obtained. It will here be noted that the build up of brake cylinder pressure is in three stages; first there will be an inshot of fluid to the brake cylinder which will increase brake cylinder pressure to produce a light application of the brakes sufficient to start the slack in the train to run in or gather gently, then there will be a slow increase in brake cylinder pressure while the slack in the train is gathering or closing, and finally there will be a rapid inshot of fluid to the brake cylinder to effect a rapid increase in brake cylinder pressure after the slack in the train has run in or gathered. By reason of this controlled build up of brake cylinder pressure harsh run in or closing of the train slack is prevented.

Since the diaphragm chamber 129 of the brake cylinder release delay valve device 17 is connected by way of passage 114 to the vent valve chamber 110 and thereby to the brake pipe, the pressure of fluid in said diaphragm chamber will reduce with brake pipe pressure. Now when the combined pressures of fluid in diaphragm chamber 130 and spring 137 becomes slightly greater than the opposing reduced brake pipe pressure in diaphragm chamber 129, the diaphragm 128 will flex upwardly and cause the delay valve 134 to seat and thereby cut off the communication between chamber 130 and brake cylinder release passage 136.

Fluid under pressure being supplied to the brake cylinder by way of passage 69 flows from said passage to the mercury well 48 by way of passage 63, passage 62 in the shaft 29 and passage 61 in the beam 27. Fluid under pressure thus supplied to the well 48 acts to displace mercury from the well to the chamber 46 by way of the passage in the tubular portion 65 of the beam and passage 66. Now when the weight of mercury in chamber 46 becomes substantially equal to that of the mercury in chamber 45, the beam will rock in a counter-clockwise direction to its balanced or service lap position as shown in Fig. 7. It will here be noted that as the mercury is forced through passage 66 and into chamber 46, the air in the passage and chamber is compressed by the mercury, so that when the desired brake cylinder pressure has been obtained, the pressure of air in chamber 46 together with the pressure of the hydrostatic head of the displaced mercury will be substantially equal to brake cylinder pressure. By reason of this, no further flow of mercury to chamber 46 can occur, thus the equalizing of the weight carried on the left hand end of the beam with that carried on the opposite end and the consequent balancing of the beam is effected.

As the beam is moving to service lap position, the lugs 126 of the beam cause the bell crank lever 121 to rock about the pin 122 in a clockwise direction and as a consequence the arm 127 of the lever moves out of its holding position with relation to the valve 20 of the quick service valve device 14 so as to permit the spring 118 to act to seat the quick service valve 115, the valve 115 when seated cutting off the quick service flow of fluid from the brake pipe. Further, as the beam is moving to service lap position it rocks the shaft 29 and thereby the arm 40 of the application valve device 12 and arm 42 of the charging control valve device 13 in the same direction to the position in which they are shown in Fig. 7. Upon such movement of the arm 40, the valve 41 is seated by the action of the spring 153 and the supply of fluid under pressure from the supply reservoir 7 to the brake cylinder is thereby cut off. It will be noted that the movement of the arm 42 is not sufficient to cause the valve seat 52 carried thereby to seat on the valve 61, so that the charging communication between the supply reservoir 7 and the chamber 38 is maintained closed by the action of the spring 159.

In case of leakage of fluid under pressure from the brake cylinder when the beam 27 is in lap position, the drop in brake cylinder pressure in well 48 due to such leakage will permit the displacement of mercury from the chamber 46 and passage 66 to well 48. This will of course unbalance the beam and it will again move to service position and cause the arm 40 of the application valve device 12 to operate to unseat the supply valve 41 so that fluid under pressure is again supplied from the supply reservoir 7 to the brake cylinder. Now when the leakage has been compensated for by the flow of fluid from the supply reservoir to the brake cylinder, the beam will be caused to move to its lap position and the supply of fluid under pressure to the brake cylinder will be cut off in the same manner as before described. It will thus be seen that brake cylinder pressure is maintained against leakage through the operation of the beam.

*Release following a service application of the brakes*

When it is desired to release the brakes following a service application thereof, the operator moves the brake valve handle 184 to running position as shown in Fig. 3, causing the pinion 182 to rotate in a counter-clockwise direction. Upon such movement of the pinion and thereby the member 181 as a whole the screw threads on the member and casing cooperate to move the member inwardly to increase the pressure of the spring 195 on the follower 178 and diaphragm 173. The spring upon thus being compressed acts to flex the diaphragm 173 downwardly, the diaphragm acting through the medium of the follower stem 180, follower stem extension 197, valve 199 and valve stem 200 to unseat valve 201 against the opposing pressure of the light coil spring 204.

With the valve 201 unseated fluid at main reservoir pressure in valve chamber 202, passage 203 and feed valve piston chamber 210 is quickly reduced into the brake pipe to brake pipe pressure, the flow of fluid at main reservoir pressure from valve chamber 214 by way of port 227 in the feed valve piston 211 being so slow that it will have no appreciable effect upon such reduction. Upon this reduction in the pressure of the fluid in piston chamber 210, fluid under pressure in valve chamber 214 causes the piston 211, piston stem 212 and thereby the slide valve 213 to move in a direction toward the right hand to brake pipe charging position in which the port 225 in the slide valve is in registration with the brake pipe passage 226. With this communication established, fluid under pressure flows from the main reservoir 2 to the brake pipe 1, and thereby to the brake pipe 6 of the tender and cars of the train.

Now when the pressure of fluid in chamber 176 which is in open communication with the brake pipe is increased slightly above the opposing pressure of the compressed spring 195, the diaphragm 173 will be flexed upwardly and will carry with it the follower 178 and stem extension 197 carried by the follower and upon such movement of the stem extension 197 the spring 204 acts to seat the valve 201 and to maintain the valve 199 in air tight engagement with the extension 197 during such seating movement. As the valve is approaching its seat it throttles off the flow of fluid from the chamber 176 to the chamber 202 and when the rate of flow of fluid past the valve becomes less than the rate of flow of fluid from the valve chamber 214 to the piston chamber 210 by way of the port 227, the pressure of fluid in chamber 210 will be increased, and since the volume of this chamber and chamber 202 is small, the pressure in these chambers will quickly equalize with that of the pressure of fluid in the main reservoir, so that at the time the valve 201 is fully closed, the spring 215 acts to move the piston 211, stem 212 and thereby the slide valve 213 to their cut off position as shown in Fig. 2.

The initial flow of fluid at high pressure from the main reservoir to the brake pipe by way of the feed valve device, rapidly increases the brake pipe pressure on the tender and cars at the head end of the train. This high head of pressure at the front end of the train is desirable for the reason that it causes a rapid flow of fluid under pressure to the rear cars of the train and thereby accelerates the release of the brakes and the charging of the brake equipment on the rear cars.

On the tender and cars of the train, fluid under pressure supplied to the brake pipe flows to the chamber 45 of the beam 27 by way of brake pipe branch pipe 111, quick action valve chamber 110, passage and pipe 113, chamber 38 in the charging control valve device 13, past valve 161, passage 51 in the arm 42 of the charging control valve device, passage 50 in the shaft 29 and passage 49 in the beam. The increase in brake pipe pressure in chamber 45, occasioned by the flow of fluid from the brake pipe, causes the displacement of mercury from said chamber to the well 47. This of course lightens the weight carried by the right hand end of the beam over that carried on the opposite end and as a consequence the beam will be caused to rock in a counterclockwise direction from service lap position to either retarded release or back-dump position as shown in Fig. 8 or to normal release position as shown in Fig. 5.

On the tender and cars at the head end of the train where the brake pipe pressure will be greatest, there will be a greater amount of mercury displaced into the well 47 of the beam as shown in Fig. 8 than will be displaced into the corresponding chamber or well on the cars at the rear end of the train where the rise in brake pipe pressure is slower and the high head of pressure is not obtained, as shown in Fig. 5. Due to the displacement of mercury from chamber 45 to well 47 by the increase in brake pipe pressure in the chamber, fluid in well 47 and connected control chamber is caused to be compressed to substantially the same pressure as the pressure of fluid in chamber 45, the amount of mercury transferred from chamber 45 and passage 53 to the well 47 being sufficient to permit the weight of the mercury at the opposite end of the beam to cause the beam to start to tilt from lap position toward release position.

As the beam is thus being tilted from lap position, the lugs 126 of the beam cause the bell crank lever 121 to rock in a clockwise direction and as the lever is moved in this direction the arm 124 thereof engages and moves the plunger 149 inwardly, i. e., in a direction towards the left hand, unseating the release valve 141 against the opposition offered by the spring 152. It will here be noted that the spring 151 does not oppose the operation of the bell crank lever as it is being moved in this direction until after, as will hereinafter appear, the lever is moved beyond release position.

On the cars at the rear end of the train where there is no high head of pressure and the brake pipe pressure is increased more gradually than on the cars at the head end of the train, the beam 27 will come to a stop in release position as shown in Fig. 5 when the fluid in the control chamber 44 is compressed by the mercury to a pressure substantially equal to the brake pipe pressure in chamber 45.

From an inspection of Fig. 5 it will be seen that when the beam 27 is in its normal release position and the release valve 141 is in full open position, the retarded release valve 140 is not seated on the seat rib 143, so that fluid under pressure may be released from the brake cylinder at the normal rate.

When, in charging the brake pipe as just described, the brake pipe pressure in diaphragm chamber 129 of the brake cylinder release delay valve device 17 has been increased slightly in excess of brake cylinder pressure in diaphragm chamber 130 the diaphragm 128 will be flexed downwardly, causing the delay valve 135 to be unseated, so that fluid under pressure is now released from the brake cylinder by way of pipe and passage 131, diaphragm chamber 130, past the fluted follower stem 133 and unseated delay valve 134, delay valve chamber 135, passage 136, past the retarded release valve 140, valve chamber 142, past the unseated release valve 141 and its fluted stem 148, chamber 145, pipe 146 and retainer valve device 147.

On the tender and cars at the head end of the train where the brake pipe pressure is temporarily greater than on the cars at the rear end of the train, there will be a greater amount of mercury displaced from passage 53 into well 47 so that the beam 27 will not come to a stop in normal release position but will continue to move beyond this position toward retarded release position. As the beam is being moved from release position the weighted end 89 of the arm 86 operatively engages the upwardly extending portion 85 of the arm 80 pivotally carried by the beam and thereby maintains the arm and vent valve 78 stationary so that while the beam continues to tilt, the seat for the valve will be moved upwardly out of sealing engagement with the valve, thus permitting fluid under pressure to be vented from the control chamber to the atmosphere by way of the fluted stem of the valve. This reduction in control chamber pressure permits the rapid displacement of more mercury from the passage 53 to well 47 so that the weight of the mercury in chamber 46 causes the beam to tilt to retarded release position as shown in Fig. 8, in which position, the beam is stopped by the engagement of the stop 83 on the casing with the stop 82 on the beam. Just before the beam reaches its retarded release position the projecting portion 85 of the arm 80 moves with the beam to the left hand side of the longitudinal center line of the arm 86 as shown in Fig. 8, so that the spring 84 acts to seat the valve 78 and thereby cut off the flow of fluid from control chamber 44 to the atmosphere.

As the beam is being tilted from its normal release position to its retarded release position as just described, the bell crank lever 121 is rocked further in a clockwise direction, so that the arm 125 thereof, acting through the medium of the plunger 149 seats the retarded release valve 140 on the seat rib 143, so that fluid under pressure is released from the brake cylinder at a retarded rate by way of the flow restricting port 144 which connects the passage 136 and valve chamber 142. It will here be noted that the plunger 149, as it is thus moved to retarded release position, compresses the heavy coil spring 151. The purpose of this spring is two-fold, first to stabilize the beam against accidental movement to retarded release position and secondly to effect the operation of the beam from retarded release position to normal release position as will hereinafter more fully appear.

As the beam is being tilted from normal release position to retarded release position the shaft 29 and thereby the arm 42 of the charging control valve device 13 is rocked in the same direction. Upon such movement of the arm 42 the valve seat 52 carried thereby is moved into seating engagement with the valve 161 and then acts through the medium of said valve and its fluted stem 160 to unseat the back-dump valve 43 against the opposing pressures of the spring 159. With the valve 43 unseated fluid under pressure flows from the supply reservoir to the brake pipe by way of pipe and passage 75, passage and pipe 155, the flow restricting passage in the choke plug 156, passage 157, past the ball check valve 158, valve chamber 154, past valve 43 and its stem 156, chamber 38 in the charging control valve device, passage and pipe 113, quick action vent valve chamber 110 and branch pipe 111. With the valve seat 52 in engagement with the valve 161 the flow of fluid from the chamber 38 of the charging control valve device 13 and therefore from the brake pipe to the chamber 45 in the beam is cut off, so that there can be no flow of brake pipe fluid from the chamber 45 and passage 53 through the control chamber 44 and supply reservoir 7. By reason of this a greater amount of fluid under pressure will flow towards the rear end of the train than would otherwise be the case.

Since the well 48 is in communication with the brake cylinder passage 60, the pressure of fluid in the well will reduce with brake cylinder pressure and, as the pressure in this chamber reduces, the mercury will be displaced from chamber 46 and passage 66 into the well 48. Now when the brake cylinder pressure has been reduced to some low degree, sufficient mercury will have been returned to well 48 to so condition the beam that the spring 151 acting through the medium of the plunger 149, arm 124 of the bell crank lever 121 and lug 126 of the beam, will cause the beam to tilt from retarded release position to normal release position. It will here be noted that upon such movement of the beam the valve seat 52 of the charging control valve device 13 is moved away from the valve 161 so that communication is now established between the chamber 38 and chamber 45 of the beam, so that the control chamber 44 and supply reservoir 7 are now recharged in the same manner as has been described in connection with the initial charging of the equipment.

*Emergency application of the brakes*

When it is desired to effect an emergency application of the brakes the operator moves the brake valve handle 184 to emergency position which causes the member 181 to rotate in a clockwise direction and upon such movement of the member the screw threads of the member and cap 172 cooperate to move the member upwardly into engagement with he pin 196 in the follower stem 179 and, through the medium of the pin, to shift the stem and thereby the follower 178, diaphragm 173, stem 180 and stem extension 197 upwardly a sufficient distance that the valve seat on the extension 197 is out of engagement with the valve 199. With the seat moved away from the valve 199 fluid under pressure is vented from the brake pipe by way of pipe and passage 177, diaphragm chamber 176, passage 198 in stem 179, chamber 174 and passage 175.

The handle 184 as it is thus moved, not only actuates the member 181 as just described, but also rotates the emergency valve 191 to emergency position as shown in Fig. 4, in which position, fluid at main reservoir pressure in chamber 192 flows through a port 250 in the valve and passage and pipe 217 to the quick action piston chamber 216 of the vent valve device 5 on the locomotive. Fluid under pressure thus supplied to the chamber 216 causes the piston 218 and thereby the quick action vent valve 220 to move downwardly, the valve being moved away from its seat rib so as to permit fluid under pressure to flow from the brake pipe to the atmosphere by way of branch pipe and passage 222, valve chamber 221, past the unseated vent valve 220 and its fluted stem 219 and passage 223.

It will here be noted that since the member 181 acting through the medium of the pin 196 and follower assembly positively holds the stem extension 197 out of engagement with the valve 199 when an emergency application of the brakes is being effected, the valve 201 will be held seated by the action of the spring 204, so that there will be no danger of the feed valve device 4 operating to supply fluid under pressure from the main reservoir to the brake pipe, thus insuring against the loss of main reservoir pressure by way of the brake pipe and quick action vent valve device 5.

The rapid reduction in brake pipe pressure which is produced by quickly venting fluid under pressure from the brake pipe to the atmosphere by means of the quick action vent valve device 5 on the locomotive is effective in the chamber 45 of the beam 27. Since the pressure of fluid in chamber 45 is quickly reduced, the pressure of fluid in control chamber 44 will quickly displace the mercury from well 47 to the passage 53 and chamber 45. This will cause the beam 27 to quickly tilt in a clockwise direction to its emergency position as shown in Fig. 9. When the level of the mercury in well 47 reaches the junction point 228 between the passage 53 and well, the member 57 will obviously be seated on the rib 59 of the beam and as a consequence fluid under pressure from the control chamber 44 will flow through the restricted port 58 in the member, past the junction point 228 and then bubble through the mercury in passage 53 and chamber 45 to the passage 49 and consequently to the brake pipe which is open to the atmosphere by way of the vent valve device 5. The purpose of this member 57 and the flow restricting port 58 therein is to prevent the pressure of fluid in the control chamber from forcing the mercury from the chamber 45 to the passages and chambers leading to the brake pipe when the sudden reduction in brake pipe pressure is effected.

As the beam 27 is being tilted in effecting an emergency application, the operation of the several parts of the equipment will be substantially the same as in effecting a service application of the brakes until such time as the beam tilts from service position to emergency position. This movement of the beam from service position to emergency position causes the bell crank lever 121 to move in a counter-clockwise direction a sufficient distance for the arm 127 thereof to seat the valve 120 against the opposing pressure of the spring 118, the valve in its seated position cutting off communication from the passage 105 leading from the quick action piston chamber 103 and the atmosphere. With this communication closed, fluid under pressure flowing from the brake pipe to the chamber 103, by way of the open quick service valve 115, causes the quick action piston to move in a direction toward the right hand to unseat the quick action valve 109 against the opposing pressure of the spring 112. With the valve 109 unseated fluid under pressure is quickly vented locally from the brake pipe and consequently from the chamber 45 of the beam 27.

Now when the brake cylinder pressure has been increased to the pressure for which the equipment is adjusted to produce in emergency, sufficient mercury will have been displaced from well 48 to chamber 46 to cause the beam 27 to tilt from emergency position to lap position as shown in Fig. 7.

When the beam 27 is in emergency position, and the brake pipe pressure has been reduced to atmospheric pressure, the control chamber will not be reduced to atmospheric pressure for the reason that as the control chamber pressure reduces the weight of the mercury in chamber 45 and passage 53 causes the mercury to flow back from the junction point 228 to the bottom of the well 47, thus bottling up fluid in the well at a pressure sufficient to prevent the gravitational flow of mercury from the chamber 45 to the well.

It will here to noted that the maximum brake cylinder pressure obtainable in effecting an emergency application of the brakes is dependent upon the amount of mercury required in chamber 46 and passage 66 to balance the weight of mercury contained in passage 53 and chamber 45 and not upon the volume of the supply reservoir 7, so that this reservoir may be made large enough to maintain brake cylinder pressure against leakage as hereinbefore described and to assist in accelerating the release of the brakes.

When the beam 27 tilts from emergency position to lap position the bell crank lever 121 will be moved by the beam to permit the quick service valve 115 to be seated and the valve 120 to be unseated by the action of the spring 118. With the valve 120 unseated fluid under pressure is vented from the quick action piston chamber 103 so that the spring 112 acts to seat the quick action vent valve 109 and thereby cut off communication from the brake pipe to the atmosphere.

*Release of the brakes following an emergency application*

When it is desired to release the brakes following an emergency application the brake valve handle 184 is moved from emergency position to running position and, as the handle is thus moved, the emergency valve 191 is moved to a corresponding position in which fluid under pressure is vented from the quick action piston chamber 216 to the atmosphere by way of pipe and passage 217, a cavity 251 in the valve 191 and a passage 252. With the chamber 216 thus vented the spring 224 acts to seat the vent valve 220 to close off the communication from the brake pipe to the passage 223 leading to the atmosphere. With the handle in this position the spring 195, due to the downward movement of the member 181 acts through the medium of the follower 178, follower stem 180 and follower stem extension 197 to unseat the valve 201. With the valve 201 unseated fluid under pressure is vented from the feed valve piston chamber 210 to the chamber 176 and consequently to the brake pipe, both of which are at atmospheric pressure, causing the feed valve device to operate to supply fluid under pressure from the main reservoir to the brake pipe. Upon thus increasing brake pipe pressure the brake valve device will operate to so control feed valve device as to limit the brake cylinder pressure to that which it is desired to carry in the equipment in substantially the same manner as has been described in connection with releasing the brakes following a service application of the brakes.

As the brake pipe pressure is being increased, the beam 27 will be tilted to either its retarded release position or to its normal release position as the case may be and the brakes will be released in substantially the same manner as they are released following a service application. There is however one difference in releasing the brakes following an emergency application and that is the sensitivity of the beam 27 to movement to release position is increased. In this connection it will be noted that since the pressure of the control chamber 44 is reduced during an emergency application to almost atmospheric pressure only a slight increase in brake pipe pressure is required to displace sufficient mercury from the chamber 45 into the well 47 to cause the beam to rock to either of its release positions. When the delay valve device 17 is employed the rapid transmission of the releasing action of the beam 27 and the several parts associated therewith will not accelerate the release of the brakes, but where all of the cars of a train are equipped with my brake equipment the delay valve device 17 will be omitted so that the accelerated release movement of the beam 27 will result in an accelerated transmission of the release of the brakes throughout a long train. This is of course very desirable in that it makes it possible to get the train under way in less time than would otherwise be the case.

Limited service application of the brakes

In order to limit the degree of brake application, the brake pipe pressure is only reduced an amount sufficient to effect the desired service application, and this is adapted to be accomplished by moving the brake valve handle 184 to the position in the application and release zone which corresponds to the degree of braking desired. The brake valve device now functions automatically to limit the reduction in brake pipe pressure according to the position of the handle as will be understood from the foregoing description. When the usual well known type of engineer's automatic brake valve device is employed the limited reduction in brake pipe pressure obtained by moving the brake valve handle from release position to service position until the desired reduction is effected and then to lap position in which the flow of fluid from the brake pipe is cut off.

This reduction in brake pipe pressure permits the pressure of fluid in control chamber 44 of the beam 27 to displace a proportionate amount of mercury from the well 47 to the chamber 45, causing the beam to move to its service position to effect the supply of fluid under pressure to the brake cylinder. Now as the pressure of fluid in the brake cylinder and consequently in the well 48 of the beam is increasing, mercury is displaced, due to the increase in fluid pressure in well 48, to passage 66 and chamber 46. When the weight of mercury in passage 66 and well 48 is sufficient to effect the balance of the beam, the beam moves to lap position, effecting the operation of the application valve device 12 to cut off the flow of fluid from the supply reservoir to the brake cylinder.

If, after a limited application of the brakes has been effected, it is desired to increase the brake cylinder pressure, a further reduction in brake pipe pressure is effected through the medium of the brake valve device, which reduction causes the beam 27 to move from lap position to service position, causing the application valve device to again operate to supply fluid under pressure from the supply reservoir to the brake cylinder. When the desired brake cylinder pressure is obtained the beam will again move to lap position, causing the application valve device to operate to cut off the flow of fluid from the supply reservoir to the brake cylinder.

From this it will be apparent that it is possible to obtain the service braking pressure up to full service in small increments or stages especially when the brake valve device shown in Fig. 2 is employed.

Description of the modification shown in Fig. 11

As long as there is a possibility of mixed brake equipments being employed in a train the brake cylinder release delay valve device 17 will be employed, but when there is no longer such a possibility, the brake cylinder release delay valve and the mechanism for controlling its operation may be omitted and the passage 114 closed by a plug 275 as shown in Fig. 11. When this is done there will be no delay in effecting the release of the brake and the release of the brakes will be controlled only by the operation of the brake cylinder release valve device 18. It will be apparent that with the delay valve omitted and the passage 114 closed as just described, either the graduated release or direct release of the brakes may be effected, the type of release being dependent upon the operation of the brake valve device.

The other operations of the apparatus may be substantially the same as those described in connection with the apparatus when the delay valve is employed.

Description of the modification shown in Fig. 12

In Fig. 12 it is shown how the apparatus may be modified for use in short trains, such as passenger trains, where there is no danger from the run in or closing of the train slack. In this modification the brake cylinder build-up control valve 14 has been omitted, so that the build up of brake cylinder pressure will be at an uninterrupted rate instead of at three different rates as is the case when the build-up control valve device is employed.

Since, on a short train, the run out of slack will not be severe the retarded release feature is omitted from the apparatus shown in Fig. 12, the release of the brakes being controlled by a release valve mechanism comprising a release valve piston 276 and a pilot release valve 277 which is adapted to be controlled by the bell-crank lever 121. The valve piston 276 has mounted in one end thereof an annular gasket 278 which is adapted to engage an annular seat rib 279 to cut off direct communication from a chamber 280 to an exhaust passage 281 leading to the atmosphere, which chamber is connected to the brake cylinder passage 131, the supply passage 98 and the control passage 63. The other end of the valve piston is provided with a valve seat 282 upon which the pilot valve 277 is adapted to seat, said pilot valve having a fluted stem 283 which extends through a central bore in the release valve and which at its end is adapted to be operatively engaged by the arm 124 of the bell-crank lever 121.

The pilot valve 277 is contained in a chamber 284 which is connected through a flow restricting passage 285 to the chamber 280. Also contained in this chamber are coil springs 286 and 287, the spring 286 tending at all times to seat the pilot valve 277 and the spring 287 tending at all times to move the valve piston toward the right hand to its seated position.

With the tiltable beam 27 in release position as shown, the arm 124 of the bell-crank lever 121 maintains the pilot valve 277 unseated against the opposing pressure of the spring 286 so that the chamber 280 and consequently the brake cylinder and other chambers connected therewith are open to the atmosphere by way of passage 285, valve chamber 284, the central bore in the valve piston 276 and passage 281. With the chamber 280 at atmospheric pressure the spring 287 acting on the valve piston maintains the gasket 278 in sealing engagement with the seat rib 279.

When, to effect an application of the brakes, the beam 27 is rocked in a clockwise direction, the bell-crank is caused to rock in the opposite direction and thereby permits the spring 286 to act to seat the pilot valve 277. After this valve is seated fluid under pressure is supplied to the brake cylinder in substantially the same manner as hereinbefore described in connection with the apparatus shown in Figs. 5 to 10 inclusive.

Now when the beam 27 is rocked in a counter-clockwise direction to effect the release of the brakes the arm 124 of the bell-crank lever 121 engages the pilot valve stem 283 and moves the pilot valve from the valve seat 282. With the valve 283 unseated, fluid under pressure is vented from the chamber 284 to the atmosphere at a rate exceeding the rate at which fluid flows through the flow restricting passage 285 to the chamber. This, of course, quickly unloads the valve piston so that fluid at brake cylinder pressure in chamber 280 and acting on that portion of the right hand end of the valve piston which surrounds the seat rib 279, causes the valve piston and gasket 278 to move inwardly against the opposing pressure of the spring 287. When the valve piston is thus moved the gasket 278 is moved out of engagement with the seat rib 279, so that fluid under pressure is now vented from the chamber 280 and consequently from the brake cylinder by way of the exhaust passage 283.

Now when the beam 27 is caused to rock toward lap position, in graduating the release of the brakes, the pilot valve will be permitted to seat so as to cut-off the flow of fluid from the chamber 284 to the atmosphere. As a result of this the flow of fluid through passage 285 will quickly build up the pressure of fluid in chamber 284 equal to that of the pressure of fluid in chamber 280. When the pressure of fluid in chamber 284 is substantially equal to that of the pressure of fluid in chamber 280 the spring 287 acts to move the valve piston toward the right hand causing the gasket 278 to engage the seat rib 279 and thereby cut-off the release of fluid from the chamber 280 and brake cylinder.

If, instead of graduating the release of the brakes, a direct release is being effected, the valve piston will remain in its open position until the brake cylinder pressure has been reduced to a low degree and will then close, the open pilot valve permitting the final venting of fluid from the brake cylinder if there be any fluid under pressure remaining in the brake cylinder at the time the valve piston is moved to its closed position.

In this modification the bell-crank lever 121 is provided with an additional arm 288 which, when the beam 27 is rocked to release position as shown in Fig. 12, is adapted to unseat a back-dump valve 289 contained in chamber 280. With the valve 289 unseated fluid under pressure is vented from the chamber 280 and consequently from the brake cylinder by way of a passage 290, past the ball check valve 291, ball check valve chamber 292, the passage in a choke plug 293, quick service valve chamber 116, passage 114, quick action valve chamber 110 and pipe 111. This additional supply of fluid materially increases the rate of recharge of the brake pipe.

When the beam 27 is caused to rock in a clockwise direction to effect an application of the brakes a spring 294 contained in the chamber 280 causes the valve 289 to seat and cut-off the communication from the brake cylinder to the brake pipe.

The check valve 291 is provided for the purpose of preventing back flow of fluid from the brake pipe to the chamber 280 and thus prevents the loss of brake pipe pressure when the chamber 280 is connected to the atmosphere.

It will here be understood that if desired this back dump valve arrangement may be incorporated in the equipment shown in Figs. 5 to 10 inclusive. In some cases it may not be desired to back-dump fluid under pressure from the supply reservoir to the brake pipe in releasing the brakes, and when such is the case, only the back-dump valve arrangements shown in Fig. 12 may be used.

*Description of modification shown in Fig. 13*

Instead of making the mercury receiving chambers 45 and 46 of the beam 27 of rectangular form as shown in Figs. 5 to 9 inclusive, they may be made circular as shown in Fig. 13.

If desired the casing of the beam 27 may be provided with baffle lugs 295 and 296 which are located interiorly of the chamber 45 and which are so arranged in overlapping relation with each other and the open end of the passage 49 as to prevent mercury in the chamber from accidentally entering the passage 49.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment, in combination, means operative to effect an application of the brakes and a subsequent release thereof, control means responsive to the force of gravity for effecting both the application and release operation of said means, and means responsive to variations in the pressure of fluid in the equipment for controlling the operation of said control means.

2. In a fluid pressure brake equipment, in combination, means operative to effect an application of the brakes and a subsequent release thereof, means responsive to the force of gravity for effecting the operation of said means, and means shiftable according to variations in the pressure of fluid in the equipment on said control means for effecting the operation of the control means.

3. In a fluid pressure brake equipment, in combination, means operative to effect an application of the brakes and a subsequent release thereof, control means operative for effecting the operation of the brake application and release means, and weight means carried by said control means and shiftable back and forth thereon by variations in the pressure of fluid in the equipment for effecting the operation of the control means.

4. In a fluid pressure brake equipment, in combination, means operative to effect an application of the brakes and a subsequent release thereof, control means operative upon shifting the disposition of weight thereon by fluid under pressure for effecting the operation of said brake application and release means, and means for controlling the pressure of fluid in the equipment to effect said shifting.

5. In a fluid pressure brake equipment, in combination, means operative to effect an application of the brakes and a subsequent release thereof, control means comprising a pivotally mounted member rockable on its pivot for effecting the operation of said means, weight means carried by said member and shiftable back and forth thereon according to variations in fluid under pressure in the equipment for varying the action of said weight means.

6. In a fluid pressure brake equipment, in combination, means operative to effect an application of the brakes and a subsequent release thereof, control means comprising a beam pivotally mounted intermediate its ends and rockable on its pivot for effecting the operation of said means, and weight means carried by the beam adapted to be displaced longitudinally thereof according to variations in the pressure of fluid in the equipment for actuating the beam.

7. In a brake equipment, in combination, means operative to effect an application of the brakes and a subsequent release thereof, and a weight controlled motor for effecting the operation of said means, said motor comprising a member tiltable in one direction in effecting an application of the brakes and in the opposite direction in effecting the release of the brakes, and weight means operative to effect the operation of said member.

8. In a brake equipment, in combination, means operative to effect an application of the brakes and a subsequent release thereof, a weight controlled beam tiltable in one direction to effect the operation of said beam to effect an application of the brakes, and tiltable in the opposite direction to a substantially level position to effect the operation of said means to lap position and tiltable in said opposite direction beyond said level position to effect the operation of said beams to effect the release of the brakes, and means for weighting said beam to control its operation.

9. In a fluid pressure brake, in combination, a brake controlling pipe, a motor responsive to the force of gravity for controlling the application and release of the brakes, and means operative according to variations in the pressure of fluid in said pipe to control the operation of said motor.

10. In a fluid pressure brake, in combination, a brake controlling pipe, motor mechanism responsive to the force of gravity for controlling the application and release of the brakes, and means responsive to variations in the pressure of fluid in said pipe for varying the action of said motor mechanism.

11. In a fluid pressure brake, in combination, a brake controlling pipe in which the pressure of fluid is adapted to be varied and a gravity motor comprising a tiltable member including shiftable means responsive to variations in the pressure of fluid in said pipe for actuating said member for controlling the application and release of the brakes.

12. In a fluid pressure brake, in combination, a brake controlling pipe and a gravity motor comprising a tiltable member including means shiftable from one position on the member to another according to variations in the pressure of fluid in said pipe for actuating said member to control the application and release of the brakes.

13. In a fluid pressure brake, in combination, a brake controlling pipe and a gravity motor comprising a tiltable member including liquid weight means confined within the member and shiftable from one place to another on the member according to variations in the pressure of fluid in said pipe for actuating said member to control the application and release of the brakes.

14. In a fluid pressure brake, in combination, a brake controlling pipe and a gravity motor comprising a member adapted to be tilted in one direction to effect an application of the brakes and to be tilted in the opposite direction to effect a release of the brakes, and means responsive to variations in the pressure of fluid in said pipe for actuating said member.

15. In a fluid pressure brake, in combination, a brake controlling pipe and a gravity motor comprising a pivotally mounted member adapted to be rocked in one direction to effect an application of the brakes and to be rocked in the opposite direction to effect the release of the brakes, and weight means carried by said member and shiftable from one place to another on the member according to variations of the pressure of said pipe to actuate said member.

16. In a fluid pressure brake, in combination, a brake controlling pipe and a motor responsive to the force of gravity for controlling the application and release of the brakes, and means responsive to variations in the pressure of fluid in said pipe and according to the degree of brake application for controlling the effect of the force of gravity on the motor and thereby control the action of said motor.

17. In a fluid pressure brake, in combination, a brake controlling pipe and a gravity motor comprising a pivotally mounted member adapted to be rocked in one direction to supply fluid under pressure to effect an application of the brakes and to be rocked in the opposite direction to release fluid under pressure to effect the release of the brakes, and means carried by said member and shiftable according to variations in the pressure of fluid in said pipe and according to variations in the brake applying fluid for controlling the application and release of the brakes.

18. In a fluid pressure brake, in combination, a brake controlling pipe and a motor operative for controlling the application and release of the brakes, and a weight operative according to variations in the pressure of fluid in said pipe for actuating said motor.

19. In a fluid pressure brake, in combination, a brake controlling pipe, valve means operative to effect the application and release of the brakes, a motor operative for effecting the operation of said valve means, and a weight operative according to variations in the pressure of fluid in said pipe for actuating said motor.

20. In a fluid pressure brake, in combination, a brake controlling pipe, a motor operative for effecting an application of the brakes and for effecting a release of the brakes, and a weight responsive to a reduction in the pressure of fluid in said pipe to actuate said motor to effect an application of the brakes and responsive to an increase in the pressure of fluid in said pipe for actuating said motor to effect a release of the brakes.

21. In a fluid pressure brake, in combination, a brake controlling pipe, a motor operative for effecting an application of the brakes and for effecting the release of the brakes and for causing fluid under pressure to be supplied to said pipe, and weight means responsive to a reduction in the pressure of fluid in said pipe for actuating said motor to effect the application of the brakes and responsive to an increase in the pressure of fluid in said pipe to actuate said motor to both effect the release of the brakes and the supply of fluid under pressure to said pipe.

22. In a fluid pressure brake, in combination, a brake controlling pipe in a reservoir normally charged with fluid under pressure, means operative for supplying fluid under pressure from said reservoir to effect the application of the brakes, and weight means responsive to the pressure of fluid in said pipe to actuate said means.

23. In a fluid pressure brake, in combination, a brake controlling pipe, a reservoir normally charged with fluid under pressure, means operative for supplying fluid under pressure from said reservoir to effect an application of the brakes and for effecting a release of the brakes and for supplying fluid under pressure from said reservoir to said pipe, and weight means responsive to variations in the pressure of fluid in said pipe to actuate said means.

24. In a fluid pressure brake, in combination, a brake controlling pipe, a reservoir normally charged with fluid under pressure, valve means operative at one time to supply fluid under pressure from said reservoir to effect an application of the brakes and operative at another time to release the brake applying fluid and to supply fluid under pressure from said reservoir to said pipe to effect the release of the brakes, means for controlling the operation of said valve means, and weight means operative according to variations in the pressure of fluid in said pipe for actuating said means.

25. In a fluid pressure brake, in combination, a brake controlling pipe, a reservoir normally charged with fluid under pressure, valve means operative at one time to supply fluid under pressure from said reservoir to effect an application of the brakes and operative at another time to release the brake applying fluid and to supply fluid under pressure from said reservoir to said pipe to effect the release of the brakes, means operative for controlling the operation of said valve means, and weight means operative according to variations in the pressure of fluid in said pipe and in the brake applying fluid for actuating said means.

26. In a fluid pressure brake equipment, in combination, means operative for controlling the application and release of the brakes, and a weight displaceable according to variations in the pressure of fluid in said equipment for actuating said means.

27. In a fluid pressure brake equipment, in combination, mechanism operative to effect the application and release of the brakes, a device movable according to variations in the disposition of weight thereon for controlling the operation of said mechanism, and means for varying the disposition of weight on said device according to variations in the pressure of fluid in said equipment.

28. In a fluid pressure brake, in combination, a brake controlling pipe, control means operative for supplying fluid under pressure to effect the application of the brakes, and weight means responsive to variations in the pressure of fluid in said pipe for actuating said control means.

29. In a fluid pressure brake, in combination, a brake controlling pipe, control means operative for first initiating a local reduction in the pressure of fluid in said pipe and then supplying fluid under pressure to effect the application of the brakes, and weight means responsive to variations in the pressure of fluid in said pipe for actuating said control means.

30. In a fluid pressure brake, in combination, a brake controlling pipe, valve means operative to effect the application of the brakes, a weight controlled member pivotally supported and rockable to actuate said means, said member having formed therein a control chamber charged with fluid under pressure substantially equal to the normal pressure of fluid carried in said pipe and having another chamber formed therein in communication with the brake pipe, a weight medium separating said chambers and subject to the opposing fluid pressures in said chambers, and displaceable by the pressure of fluid in the control chamber to said other chamber upon a reduction in the pressure of fluid in said pipe and thereby in said other chamber to cause said member to rock to actuate said means.

31. In a fluid pressure brake, in combination, a brake controlling pipe, valve means operative to effect the application of the brakes, a weight controlled member pivotally supported and rockable to actuate said means, said member having formed therein a control chamber charged with fluid under pressure and having formed therein adjacent one of its ends another chamber which is in communication with the brake controlling pipe, a communication connecting said chambers, a weight in said communication subject to the opposing pressures of said chambers and movable into said other chamber by fluid under pressure in the control chamber upon a reduction in brake controlling pipe pressure and the consequent reduction in the pressure of fluid in said other chamber, to weight the member to cause it to rock to actuate said means.

32. In a fluid pressure brake, in combination, a brake controlling pipe, valve means operative to effect the application of the brakes, a weight controlled member pivotally supported and rockable to actuate said means, said member having formed therein a control chamber charged with fluid under pressure and having formed therein adjacent one of its ends another chamber which is in communication with the brake controlling pipe, a communication extending between and connected to said chambers, means in said communication subject to the opposing pressures of fluid in said chambers and displaceable into said other chamber by fluid under pressure in said control chamber upon a reduction in brake controlling pipe pressure and the consequent reduction in the pressure of fluid in said other chamber for weighting said member to cause it to rock to actuate said means.

33. In a fluid pressure brake, in combination, a brake controlling pipe, means operative to effect the application of the brakes, a weight control member pivotally supported and rockable to actuate said means, said member having formed therein a control chamber charged with fluid under pressure and having formed therein adjacent one of its ends another chamber which is in communication with the brake controlling pipe, a communication connecting said chambers, liquid means in said communication displaceable into said other chamber by fluid under pressure in said control chamber upon a reduction in brake controlling pipe pressure and the consequent reduction in the pressure of fluid in said other chamber for weighting said member to cause it to rock to actuate said means.

34. In a fluid pressure brake, in combination, a brake controlling pipe, means operative to effect the application of the brakes, a weight controlled member pivotally supported and rockable to actuate said means, said member having formed therein a control chamber charged with fluid under pressure from the brake controlling pipe and having formed therein adjacent one of its ends another chamber which is in communication with the brake controlling pipe, a communication connecting said chambers, liquid means in said communication displaceable by the pressure of fluid in said control chamber upon a reduction in brake controlling pipe pressure and the consequent reduction in the pressure of fluid in said other chamber for causing said member to rock to actuate said means, said liquid means permitting fluid under pressure to flow from said pipe to said control chamber and preventing the flow of fluid from said control chamber to said pipe.

35. In a fluid pressure brake, in combination, a brake pipe, a brake cylinder, a brake controlling valve device operative upon a reduction in brake pipe pressure for supplying fluid under pressure to effect an application of the brakes and operative upon a subsequent increase in brake pipe pressure for releasing fluid under pressure from the brake cylinder to effect the release of the brakes, said brake controlling valve device comprising a normally closed supply valve and a normally opened release valve, a member rockable in one direction to brake applying position to close said release valve and to open said supply valve and rockable in the opposite direction to a brake releasing position to close said supply valve and open said release valve, and weight means responsive to variations in both brake pipe and brake cylinder pressure for effecting and controlling the operation of said member.

36. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in the brake pipe pressure for releasing fluid under pressure from the brake cylinder to effect the release of the brakes, said brake controlling valve device comprising a normally closed supply valve and a normally open release valve, a member rockable in one direction to a brake applying position to close said release valve and open said supply valve and rockable in the opposite direction to lap position to close said supply valve and rockable further in the opposite direction to brake releasing position to open said release valve, a weight movable to one end of the member in response to a reduction in brake pipe pressure to cause said member to rock to brake applying position, a weight movable to the other end of the member in response to an increase in brake cylinder pressure for counterbalancing said member to cause the member to rock to lap position, the first mentioned weight being movable from the end of said member in response to an increase in brake pipe pressure to render the weight at the other end of the member effective to rock the member to brake releasing position.

37. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a rockable member operative to control the operation of said valve means, and weights displaceable on said member according to variations in brake pipe pressure for rocking the member.

38. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a weight controlled rockable member operative to control the operation of said valve means, and means for weighting said member in proportion to the degree of variations in brake pipe pressure for controlling the operation of the member and thereby said valve means.

39. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a rockable member operative to control the operation of said valve means, a weight carried by said member and displaceable thereon according to the variations in brake pipe pressure for rocking said member, and another weight carried by the member and displaceable thereon according to variations in brake cylinder pressure for also rocking said member, said weights acting jointly to control the rocking movement of the member.

40. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a rockable member operative to control the operation of said valve means, a weight carried by said member and displaceable to one end thereof according to variations in brake pipe pressure for rocking said member, and another weight carried by the member and displaceable to the opposite end thereof according to variations in brake cylinder pressure for rocking said member, said weights acting jointly to control the rocking movement of the member.

41. In a fluid pressure brake, in combination, a brake pipe, a brake cylinder, a brake controlling valve device operative upon a reduction in brake pipe pressure for supplying fluid under pressure to the brake cylinder to effect an application of the brakes, and operative upon a subsequent increase in the brake pipe pressure for releasing fluid under pressure to said brake cylinder to effect a release of the brakes, said brake controlling valve device comprising valve means operative to control the supply of fluid under pressure to and the release of fluid under pressure from the brake cylinder, a weight controlled rockable member operative to control the operation of said valve means, and two weights carried by said member and each being displaceable on the member in a direction opposite to the direction of displacement of the other for controlling the operation of the member.

42. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinders to effect a release of the brakes, said brake controlling valve device comprising valve means operative to control the supply of fluid under pressure to and the release of fluid under pressure from the brake cylinder, a weight controlled rockable member operative to control the operation of said valve means, two weights carried by said member and each being displaceable on the member by fluid under pressure in directions opposite to the direction of displacement of the other for controlling the operation of the member.

43. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a weight controlled rockable member operative to control the operation of said valve means, two weights carried by said member and each being displaceable on the member by fluid under pressure in a direction opposite to the direction of displacement of the other for controlling the operation of the member, one of said weights being subject to brake pipe pressure and the opposing pressure of a chamber charged with fluid and displaceable upon variations in brake pipe pressure, and the other of said weights being subject to brake cylinder pressure and the opposing pressure of fluid in a compression chamber and displaceable upon variations in brake cylinder pressure.

44. In a fluid pressure brake, in combination, a brake pipe, a brake cylinder, a brake controlling valve device operative upon a reduction in brake pipe pressure for supplying fluid under pressure to the brake cylinder to effect an application of the brakes and operative upon a subsequent increase in brake pipe pressure for releasing fluid under pressure from the brake cylinder to effect a release of the brakes, said brake controlling valve device comprising valve means operative to control the supply of fluid under pressure to and the release of fluid under pressure from the brake cylinder, a weight controlled rockable member operative to control the operation of said valve means, two weights carried by said member and each being displaceable on the member, by fluid under pressure, in a direction opposite to the direction of displacement of the other for controlling the operation of the member, one of said weights being subject to brake pipe pressure and an opposing pressure which varies according to the movement of the weight and displaceable upon variations in brake pipe pressure, and the other of said weights being subject to brake cylinder pressure and an opposing pressure which varies according to the movement of the weight and displaceable upon variations in brake cylinder pressure.

45. In a fluid pressure brake, in combination, a brake pipe, mechanism comprising a casing and including means operative to effect the application and release of the brakes, means pivotally carried by said casing and rockable in one direction to effect the operation of said mechanism to apply the brakes and rockable in the opposite direction to effect the operation of said mechanism to release the brakes, and means responsive to variations in brake pipe pressure for effecting the operation of said means.

46. In a fluid pressure brake, in combination, a brake pipe, mechanism comprising a casing and including means operative to effect the application and release of the brakes, means pivotally carried by said casing and rockable in one direction to effect the operation of said mechanism to apply the brakes and rockable in the opposite direction to effect the operation of said mechanism to release the brakes, and means responsive to a reduction in brake pipe pressure for causing the member to rock to its brake application position and responsive to an increase in brake pipe pressure for causing a mechanism to rock to its brake releasing position.

47. In a fluid pressure brake, in combination, a brake pipe, mechanism comprising a casing and including means operative to effect the application and release of the brakes, and means carried by said casing and rockable relative thereto according to variations in brake pipe pressure for effecting the operation of said mechanism.

48. In a fluid pressure brake, in combination, a brake pipe, mechanism comprising a casing and including means operative to effect the application and release of the brakes, control means carried by said casing and rockable relative thereto for effecting the operation of said mechanism, and weight means operative according to variations in brake pipe pressure for actuating said control means.

49. In a fluid pressure brake, in combination, a brake pipe, valve means operative to effect an application of the brakes, pivotally mounted means rockable in response to a gradual reduction in brake pipe pressure to actuate said valve means to effect a service application of the brakes and rockable in response to a rapid reduction in brake pipe pressure to actuate said valve means to effect an emergency application of the brakes.

50. In a fluid pressure brake, in combination, a brake pipe, valve means operative to effect an application of the brakes, and pivotally mounted means rockable in response to a reduction in brake pipe pressure to actuate said valve means to effect an application of the brakes, and rockable in response to brake cylinder pressure to actuate said valve means to lap position upon the attainment of the desired degree of brake application for any given reduction in brake pipe pressure.

51. In a fluid pressure brake, in combination, a brake pipe, valve means operative to effect an application and a release of the brakes, and pivotally mounted means rockable in response to a reduction in brake pipe pressure to actuate said valve means to effect an application of the brakes and rockable in response to a subsequent increase in brake pipe pressure at a certain rate to actuate said valve means to effect the normal release of the brakes and rockable in response to an increase in brake pipe pressure at a more rapid rate to actuate said valve means to release the brakes at a retarded rate.

52. In a fluid pressure brake, in combination, a brake pipe, valve means operative to effect an application and a release of the brakes, pivotally mounted means rockable in response to a reduction in brake pipe pressure to actuate said valve means to effect an application of the brakes and rockable in response to a subsequent increase in brake pipe pressure at a certain rate to actuate said valve means to effect the normal release of the brakes and rockable in response to an increase in brake pipe pressure at a more rapid rate to actuate said valve means to release the brakes at a retarded rate, and means separate from said pivotally mounted means for delaying the release of the brakes.

53. In a fluid pressure brake, in combination, a brake pipe, valve means operative to effect an application and a release of the brakes, pivotally mounted means rockable in response to a reduction in brake pipe pressure to actuate said valve means to effect an application of the brakes and rockable in response to an increase in brake pipe pressure at a certain rate to actuate said valve means to effect the normal release of the brakes and rockable in response to an increase in brake pipe pressure at a more rapid rate to actuate said valve means to release the brakes at a retarded rate, and means separate from the pivotally mounted means for delaying the release of the brakes until the brake cylinder pressure has been increased to a predetermined degree.

54. In a fluid pressure brake, in combination, a brake pipe, valve means operative to effect an application and a release of the brakes, pivotally mounted means rockable in response to a reduction in brake pipe pressure to actuate said valve means to effect an application of the brakes and rockable in response to an increase in brake pipe pressure at a certain rate to actuate said valve means to effect the normal release of the brakes and rockable in response to an increase in brake pipe pressure at a more rapid rate to actuate said valve means to release the brakes at a retarded rate, and means separate from the pivotally mounted means for delaying the release of the brakes until brake pipe pressure has been increased above that required to operate the usual piston controlled type of triple valve device to release position.

55. In a fluid pressure brake, in combination, a brake pipe, valve means operative at one time to supply fluid under pressure to effect an application of the brakes and operative at another time to establish a communication through which fluid under pressure is adapted to be released to effect the release of the brakes, pivotally mounted means rockable in response to a reduction in brake pipe pressure for actuating said valve means to supply fluid under pressure to effect an application of the brakes and rockable in response to an increase in brake pipe pressure for actuating said valve means to establish said communication, and means for delaying the release of fluid under pressure by way of said communication until the brake pipe pressure exceeds the pressure of fluid supplied to effect the application of the brakes.

56. In a fluid pressure brake, in combination, a brake pipe, valve means operative at one time to supply fluid under pressure to effect an application of the brakes and operative at another time to establish a communication through which fluid under pressure is adapted to be released to effect the release of the brakes, pivotally mounted means rockable in response to a reduction in brake pipe pressure for actuating said valve means to supply fluid under pressure to effect an application of the brakes and rockable in response to an increase in brake pipe pressure for actuating said valve means to establish said communication, and valve means subject to the opposing pressures of the brake pipe and fluid supplied to effect an application of the brakes and a spring and operative when the brake pipe pressure exceeds the opposing pressure for releasing fluid under pressure supplied to effect an application of the brakes by way of said communication.

57. In a fluid pressure brake, in combination, a brake pipe, a brake controlling mechanism operative upon a gradual reduction in brake pipe pressure to vent fluid under pressure from the brake pipe through a passage open to the atmosphere and to effect a service application of the brakes and operative upon a sudden reduction in brake pipe pressure to vent fluid under pressure from the brake pipe to said passage and to effect an emergency application of the brakes, a valve operative upon movement of the brake controlling mechanism to emergency position to cut off communication between said passage and the atmosphere to permit the pressure of fluid in said passage to increase, and a quick action valve device operative upon the increase in the pressure of fluid in said passage for venting fluid under pressure from the brake pipe.

58. In a fluid pressure brake, in combination, a brake pipe, a brake controlling mechanism operative upon a gradual reduction in brake pipe pressure to vent fluid under pressure from the brake pipe through a passage open to the atmosphere and to effect a service application of the brakes and operative upon a sudden reduction in brake pipe pressure to vent fluid under pressure from the brake pipe to said passage and to effect an emergency application of the brakes, and operative upon an increase in brake pipe pressure to effect the release of the brakes, means operative upon movement of the brake controlling mechanism to emergency position to cut off communication between said passage and the atmosphere to permit the pressure of fluid in said passage to increase, and a quick action valve operative upon the increase in the pressure of fluid in said passage for venting fluid under pressure from the brake pipe, said means being operative upon movement of the brake controlling mechanism to release position for establishing communication between said passage and the atmosphere, to effect the operation of said quick action valve device to close communication from the brake pipe to the atmosphere.

59. In a fluid pressure brake, in combination, a brake pipe, a brake controlling mechanism operative upon a gradual reduction in brake pipe pressure to vent fluid under pressure from the brake pipe through a passage open to the atmosphere and to effect a service application of the brakes, and operative upon a sudden reduction in brake pipe pressure to vent fluid under pressure from the brake pipe to said passage and to effect an emergency application of the brakes and operative upon an increase in brake pipe pressure to cut off the flow of fluid from said brake pipe to said passage and to effect the release of the brakes, a valve operative upon movement of the brake controlling mechanism to emergency position to cut off communication between said passage and the atmosphere to permit the pressure of fluid in said passage to increase, and a quick action valve device operative upon the increase in pressure of fluid in said passage for venting fluid under pressure from the brake pipe, said valve being operative upon movement of the brake controlling mechanism to release position to vent fluid under pressure from said passage to effect the operation of said quick action valve device to close communication from the brake pipe to the atmosphere.

60. In a fluid pressure brake, in combination, a brake pipe, means operative to control the application and the release of the brakes, and a pivotally mounted member rockable in one direction to effect the operation of said means to effect an application of the brakes and rockable in the opposite direction to effect the operation of said means to effect the release of the brakes, said member having weights normally located intermediate its ends adapted to be distributed according to variations in brake pipe pressure between their normal positions and the ends of the members for effecting the operation of the member.

61. In a fluid pressure brake, in combination, a brake pipe, means operative to control the application and release of the brakes, and a pivotally mounted member rockable in one direction to effect the operation of said means to effect an application of the brakes and rockable in the opposite direction to effect the operation of said means to effect the release of the brakes, said member having a chamber at one end in communication with the brake pipe and also having a control chamber adapted to be charged with fluid under pressure from the brake pipe, a liquid weight in the communication through which fluid under pressure is adapted to flow to the control chamber, a fluid for charging the control chamber being adapted to pass through said liquid weight but being trapped in the control chamber by the liquid weight, the pressure of fluid in the control chamber being adapted to displace the weight to the chamber at said end of the member upon a reduction in brake pipe pressure, said weight when so displaced causing the member to rock to brake application position.

62. In a fluid pressure brake, in combination, a brake pipe, a valve mechanism operative to effect both service and emergency applications of the brakes, and a pivotally mounted member rockable upon a service reduction in brake pipe pressure to effect the operation of said valve mechanism to effect a service application of the brakes and rockable upon an emergency reduction in brake pipe pressure to effect the operation of said valve mechanism to effect an emergency application of the brakes, and weights carried by said member and adapted to be distributed thereon according to variations in brake pipe pressure for controlling the operation of the member.

63. In a fluid pressure brake, in combination, a brake pipe, a valve mechanism operative to effect both service and emergency applications of the brakes, and a pivotally mounted member rockable upon a service reduction in brake pipe pressure to effect the operation of said valve mechanism to effect a service application of the brakes and operative upon an emergency reduction in brake pipe pressure to effect the operation of said valve mechanism to effect an emergency application of the brakes, and weight means carried by said member and adapted to be distributed thereon according to the reduction in brake pipe pressure for controlling the operation of the member.

64. In a fluid pressure brake, in combination, a brake pipe, a valve mechanism operative to effect either a service or an emergency application of the brakes and also operative to effect the release of the brakes, and a pivotally mounted member rockable upon an emergency reduction in brake pipe pressure to effect the operation of said valve mechanism to effect an emergency application of the brakes and operative upon a subsequent increase in brake pipe pressure for effecting the release of the brake and for supplying fluid under pressure to the brake pipe.

65. In a fluid pressure brake, in combination, a brake pipe, valve means operative to effect an application and a release of the brakes, pivotally mounted means rockable in response to a reduction in brake pipe pressure to actuate said valve means to effect an application of the brakes and rockable in response to a subsequent increase in brake pipe pressure at a certain rate to actuate said valve means to effect the normal release of the brakes and rockable in response to an increase in brake pipe pressure at a more rapid rate to actuate said valve means to release the brakes at a retarded rate, and means for yieldably resisting movement of said pivotally mounted means to retarded release position.

66. In a fluid pressure brake, in combination, a brake pipe, valve means operative to effect an application and a release of the brakes, pivotally mounted means rockable in response to a reduction in brake pipe pressure to actuate said valve means to effect an application of the brakes and rockable in response to a subsequent increase in brake pipe pressure at a certain rate to actuate said valve means to effect the normal release of the brakes and rockable in response to an increase in brake pipe pressure at a more rapid rate to actuate said valve means to release the brakes at a retarded rate, and a spring for yieldably resisting movement of said pivotally mounted means to retarded release position.

67. In a train fluid pressure brake system, in combination, a brake pipe extending from end to end of the train and which is adapted, in effecting a release of the brakes, to be temporarily charged with fluid under pressure at a faster rate at the front end of the train than at the rear end of the train, valve means on each vehicle of the train for releasing the vehicle brakes, and pivotally mounted means on each vehicle of the train adapted to be rocked to one or the other of two positions for actuating the valve means carried by the vehicle to release the vehicle brakes, said pivotally mounted means on the vehicles at the front end of the train being responsive to the increase in brake pipe pressure to actuate said valve means to effect the retarded release of the brakes and on the vehicles at the rear end of the train being responsive to the increase in brake pipe pressure to actuate said valve means to effect the normal release of the brakes.

68. In a train fluid pressure brake system, in combination, a brake pipe extending from end to end of the train and which is adapted, in effecting a release of the brakes, to be temporarily charged with fluid under pressure at a faster rate at the front end of the train than at the rear end of the train, valve means on each vehicle of the train for releasing the vehicle brakes, and pivotally mounted means on each vehicle of the train adapted to be rocked to one or the other of two positions for actuating the valve means carried by the vehicle to release the vehicle brakes, said pivotally mounted means on the vehicles at the front end of the train being responsive to the increase in brake pipe pressure to actuate said valve means to effect the retarded release of the brakes and on the vehicles at the rear end of the train being responsive to the increase in brake pipe pressure to actuate said valve means to effect the normal release of the brakes, and means operative upon the equalization of brake pipe pressure at the front end of the train toward the rear end of the train for rocking the pivotally mounted means on the vehicles at the front end of the train from retarded release position to normal release position.

69. In a fluid pressure brake, in combination, a brake pipe, a brake cylinder, a brake controlling valve device operative upon a reduction in brake pipe pressure to supply fluid under pressure to the brake cylinder to effect an application of the brakes, a passage through which fluid flows to the brake cylinder, and means movable upon a predetermined increase in brake cylinder pressure for restricting the flow area of said passage and operative upon a further increase in brake cylinder pressure out of its restricting position.

70. In a fluid pressure brake, in combination, a brake pipe, a brake cylinder, a brake controlling valve device operative upon a reduction in brake pipe pressure to supply fluid under pressure to the brake cylinder to effect an application of the brakes, a passage through which fluid flows to the brake cylinder, and means movable upon a predetermined increase in brake cylinder pressure into said passage to restrict the flow of fluid to the brake cylinder and movable upon a further increase in brake cylinder pressure to a position free of said passage.

71. In a fluid pressure brake, in combination, a brake pipe, a brake cylinder, a brake controlling valve device operative upon a reduction in brake pipe pressure to supply fluid under pressure to the brake cylinder to effect an application of the brakes, a passage through which fluid flows to the brake cylinder, and means movable into and out of said passage according to variations in brake cylinder pressure for varying the rate of flow of fluid to the brake cylinder.

72. In a fluid pressure brake, in combination, a brake pipe, a brake cylinder, a brake controlling valve device operative upon a reduction in brake pipe pressure to supply fluid under pressure to the brake cylinder to effect an application of the brakes, a passage through which fluid flows to the brake cylinder, a member movable into and out of said passage to vary the rate of flow of fluid therethrough to the brake cylinder, and means subject to variations in brake cylinder pressure for actuating said member.

BURTON S. AIKMAN.